(12) United States Patent
Booth

(10) Patent No.: US 10,220,608 B2
(45) Date of Patent: Mar. 5, 2019

(54) INKING APPARATUS OF A PRINTING PRESS, PRINTING PRESS COMPRISING THE SAME AND METHOD OF PRODUCING A VIBRATOR ROLLER

(71) Applicant: KBA-NotaSys SA, Lausanne (CH)

(72) Inventor: Bradley Booth, Melbourne (AU)

(73) Assignee: KBA-NotaSys SA, Lausanne (CH)

( * ) Notice: Subject to any disclaimer, the term of this patent is extended or adjusted under 35 U.S.C. 154(b) by 126 days.

(21) Appl. No.: 15/512,247

(22) PCT Filed: Sep. 15, 2015

(86) PCT No.: PCT/IB2015/057093
§ 371 (c)(1),
(2) Date: Mar. 17, 2017

(87) PCT Pub. No.: WO2016/042482
PCT Pub. Date: Mar. 24, 2016

(65) Prior Publication Data
US 2018/0229494 A1    Aug. 16, 2018

(30) Foreign Application Priority Data
Sep. 19, 2014    (EP) .................................... 14185586

(51) Int. Cl.
*B41F 31/00* (2006.01)
*B41F 31/04* (2006.01)
(Continued)

(52) U.S. Cl.
CPC .............. *B41F 31/04* (2013.01); *B33Y 80/00* (2014.12); *B41F 11/02* (2013.01); *B41F 31/18* (2013.01);
(Continued)

(58) Field of Classification Search
CPC .......... B41F 31/00; B41F 31/04; B41F 31/14; B41F 31/18; B41F 31/26; B41F 11/02;
(Continued)

(56) References Cited

U.S. PATENT DOCUMENTS

| 4,509,424 A | 4/1985 | Germann |
| 4,559,874 A | 12/1985 | Schuhmann et al. |

(Continued)

FOREIGN PATENT DOCUMENTS

| EP | 0 131 103 | 1/1985 |
| EP | 0 444 227 | 9/1991 |

(Continued)

OTHER PUBLICATIONS

International Search Report for PCT/IB2015/057093 dated Mar. 17, 2016, 3 pages.

(Continued)

*Primary Examiner* — Leslie J Evanisko
(74) *Attorney, Agent, or Firm* — Nixon & Vanderhye P.C.

(57) ABSTRACT

There is described an inking apparatus of a printing press, in particular an offset or letterpress printing press, comprising at least one ink duct (11, 12) with an ink supply roller (13, 14), an ink roller train (30) comprising at least one inking roller (31) which receives ink from the at least one ink duct (11, 12), and at least one vibrator roller (15, 16) interposed between the ink supply roller (13, 4) and the inking roller (31), which vibrator roller (15, 16) is swung back and forth between the ink supply roller (13, 14) and the inking roller (31) and intermittently transfers ink from the ink supply roller (13, 14) to the inking roller (31). A circumference of the vibrator roller (15, 16) exhibits an ink-transfer 10 structure (15a, 16a) which reflects a desired inking profile of a printing plate to be inked by the inking apparatus and is designed to modulate a quantity of ink transferred by the (Continued)

vibrator roller (15, 16). The ink-transfer structure (15a, 16a) on the circumference of the vibrator roller (15, 16) is subdivided, in a circumferential direction (y) of the vibrator roller (15, 16), into an integer number 1 ($r$) of individual ink-transfer portions (15b, 16b) that are repeated with a determined circumferential period ($\Delta y$) in the circumferential direction (y), each individual ink-transfer portion (15b, 16b) reflecting the desired inking profile of the printing plate to be inked by the inking apparatus. A contact length (CL) over which the vibrator roller (15, 16) runs in contact with the ink supply roller (13, 204) is equivalent to the determined circumferential period ($\Delta y$) of the individual ink-transfer portions (15b, 16b) or to an integer multiple of the determined circumferential period ($\Delta y$) of the individual ink-transfer portions (15b, 16b).

24 Claims, 15 Drawing Sheets

(51) Int. Cl.
  *B41F 31/26*  (2006.01)
  *B41F 11/02*  (2006.01)
  *B33Y 80/00*  (2015.01)
  *B41F 31/18*  (2006.01)
  *B33Y 10/00*  (2015.01)

(52) U.S. Cl.
  CPC ............... *B41F 31/26* (2013.01); *B33Y 10/00* (2014.12); *B41P 2200/13* (2013.01); *B41P 2231/10* (2013.01); *B41P 2231/12* (2013.01)

(58) Field of Classification Search
  CPC .............. B41P 2200/13; B41P 2231/10; B41P 2231/12
  USPC ..... 101/350.3, 351.6, 352.06, 352.1, 352.11, 101/352.13
  See application file for complete search history.

(56) References Cited

U.S. PATENT DOCUMENTS

| | | |
|---|---|---|
| 4,574,696 A | 3/1986 | Giori |
| 4,584,939 A | 4/1986 | Giori |
| 4,633,777 A | 1/1987 | Germann |
| 4,640,189 A | 2/1987 | Hernandez |
| 4,697,515 A | 10/1987 | Germann |
| 4,766,809 A | 8/1988 | Giori et al. |
| 4,794,856 A | 1/1989 | Giori |
| 5,007,339 A | 4/1991 | Germann |
| 5,009,156 A | 4/1991 | Germann |
| 5,036,763 A | 8/1991 | Germann |
| 5,136,942 A | 8/1992 | Germann |
| 5,142,979 A | 9/1992 | Funada et al. |
| 6,101,939 A | 8/2000 | Giori et al. |
| 6,516,718 B2 | 2/2003 | Kamoda et al. |
| 6,877,429 B2 | 4/2005 | Kusaka et al. |
| 8,065,957 B2 | 11/2011 | Schaede et al. |
| 8,528,477 B2 | 9/2013 | Schaede et al. |
| 8,726,805 B2 | 5/2014 | Stöhr et al. |
| 8,869,697 B2 | 10/2014 | Kress et al. |
| 8,943,967 B2 | 2/2015 | Hans et al. |
| 2002/0035936 A1 | 3/2002 | Kamoda et al. |
| 2003/0110964 A1 | 6/2003 | Kusaka et al. |
| 2007/0006757 A1 | 1/2007 | Kusaka |
| 2008/0271620 A1 | 11/2008 | Hoier et al. |
| 2009/0007807 A1 | 1/2009 | Schaede et al. |
| 2009/0025594 A1 | 1/2009 | Schaede et al. |
| 2009/0101030 A1 | 4/2009 | Stohr et al. |
| 2013/0319269 A1 | 12/2013 | Türke et al. |
| 2014/0158007 A1 | 6/2014 | Kress et al. |
| 2014/0238257 A1 | 8/2014 | Hans et al. |
| 2015/0290927 A1 | 10/2015 | Franz et al. |

FOREIGN PATENT DOCUMENTS

| | | |
|---|---|---|
| EP | 1 149 699 | 10/2001 |
| EP | 1 319 509 | 6/2003 |
| EP | 1 738 907 | 1/2007 |
| JP | 57-123062 | 7/1982 |
| JP | 63-81045 | 4/1988 |
| JP | 2000-62134 | 2/2000 |
| WO | WO 2006/129245 | 12/2006 |
| WO | WO 2007/042919 | 4/2007 |
| WO | WO 2007/105059 | 9/2007 |
| WO | WO 2007/105061 | 9/2007 |
| WO | WO 2012/049610 | 4/2012 |
| WO | WO 2013/001009 | 1/2013 |
| WO | WO 2013/001010 | 1/2013 |
| WO | WO 2013/001518 | 1/2013 |
| WO | WO 2014/056711 | 4/2014 |

OTHER PUBLICATIONS

Written Opinion of the ISA for PCT/IB2015/057093 dated Mar. 17, 2016, 7 pages.
H. Kippan, Handbook of Print Media / Technologies and Production Methods, Heidelberg, ISBN 3-540-67326-1, Springer Verlag, Chapter 2.1.1.3 "Inking units", 2001, pp. 213-217.

INKING APPARATUS OF A PRINTING PRESS, PRINTING PRESS COMPRISING THE SAME AND METHOD OF PRODUCING A VIBRATOR ROLLER

This application is the U.S. national phase of International Application No. PCT/IB2015/057093 filed Sep. 15, 2015 which designated the U.S. and claims priority to EP Patent Application No. 14185586.6 filed Sep. 19, 2014, the entire contents of each of which are hereby incorporated by reference.

TECHNICAL FIELD

The present invention generally relates to an inking apparatus of a printing press, in particular of an offset or letterpress printing press, and a printing press comprising the same.

More precisely, the invention relates to such an inking apparatus that comprises at least one ink duct with an ink supply roller, an ink roller train comprising at least one inking roller which receives ink from the at least one ink duct, and at least one vibrator roller interposed between the ink supply roller and the inking roller, which vibrator roller is swung back and forth between the ink supply roller and the inking roller and intermittently transfers ink from the ink supply roller to the inking roller.

The present invention further relates to a method of producing a vibrator roller suitable for use as the at least one vibrator roller of the aforementioned inking apparatus.

BACKGROUND OF THE INVENTION

Inking apparatuses of the type comprising a vibrator roller that is swung back and forth between an ink supply roller and an inking roller of an ink roller train in order to intermittently transfer ink from the ink supply roller to the inking roller are well-known as such in the art. Such ink apparatuses are in particular used in a variety of offset and letterpress printing presses used for commercial printing applications as well as for high security printing applications.

Inking apparatuses of the aforementioned type (and printing presses using the same) are in particular discussed in the "Handbook of Print Media/Technologies and Production Methods" (Helmut Kipphan, Springer-Verlag, 2001, ISBN 3-540-67326-1), Chapter 2.1.1.3, "Inking units" (pp. 213-217).

U.S. Pat. No. 4,509,424, U.S. Pat. No. 4,574,696, U.S. Pat. No. 4,584,939, U.S. Pat. No. 4,633,777, U.S. Pat. No. 4,640,189, U.S. Pat. No. 4,697,515, U.S. Pat. No. 4,766,809, U.S. Pat. No. 4,794,856, U.S. Pat. No. 5,007,339, U.S. Pat. No. 5,009,156, U.S. Pat. No. 5,036,763, U.S. Pat. No. 5,136,942, U.S. Pat. No. 6,101,939 for instance describe printing presses of the type comprising an offset printing group for the simultaneous recto-verso printing of a web or sheets as used for the production of security documents, in particular banknotes, which offset printing group comprises individual inking apparatuses of the above-mentioned type. In these particular instances, at least some of the individual inking apparatuses may include two separate ink ducts and vibrator rollers feeding inks to a same ink roller train. Two ink ducts are useful to ink a same printing plate with at least two different inks, which two different inks can furthermore be partially mixed in the axial direction to produce so-called iris (or rainbow) effects. Further examples of similar offset printing presses are disclosed in International Publications Nos. WO 2007/042919 A2, WO 2007/105059 A1, WO 2007/105061 A1, WO 2012/049610 A1, WO 2013/001518 A1, WO 2013/001009 A1, WO 2013/001010 A2 and WO 2014/056711 A1.

Letterpress printing presses, in particular numbering presses, as used for the production of security documents also typically make use of similar inking apparatuses with either one or two ink ducts. An example thereof is disclosed in International (PCT) Publication No. WO 2006/129245 A2.

Further examples of printing presses making use of vibrator-type inking apparatuses are known from European Patent Publications Nos. EP 0 444 227 A1, EP 1 149 699 A2, EP 1 319 509 A1, EP 1 738 907 A2 and Japanese Patent Applications Nos. JP 57-123062 A, JP 63-081045 A, JP 2000-062134 A.

FIGS. 1 and 2 illustrate a known sheet-fed offset printing press for simultaneous recto-verso printing of sheets of security documents as typically used for the production of banknotes, which printing press is designated globally by reference numeral 100. Such printing press is in particular marketed by the present Applicant under the product designation Super Simultan® IV. The basic configuration of this printing press is already described in International (PCT) Publication No. WO 2007/105059 A1, which publication is incorporated herein by reference in its entirety.

This printing press 100 comprises an offset printing group 101, which is specifically adapted to perform simultaneous recto-verso offset printing of the sheets and comprises, as is typical in the art, two blanket cylinders (or impression cylinders) 110, 120 (referenced in FIG. 2) rotating in the direction indicated by the arrows and between which the sheets are fed to receive multicolour impressions. In this example, blanket cylinders 110, 120 are three-segment cylinders which are supported between a pair of side frames designated by reference numeral 150. The blanket cylinders 110, 120 receive and collect different ink patterns in their respective colours from plate cylinders 115 and 125 (four on each side) which are distributed around a portion of the circumference of the blanket cylinders 110, 120. These plate cylinders 115 and 125, which each carry a corresponding printing plate PP, are themselves inked by corresponding inking apparatuses 10 and 20, respectively. The two groups of inking apparatuses 10, 20 are advantageously placed in two inking carriages 151, 152 that can be moved toward or away from the centrally-located plate cylinders 115, 125 and blanket cylinders 110, 120.

As is known in the art, each printing plate PP is wrapped around the corresponding plate cylinder 115, 125 and clamped at its leading end and trailing end by a suitable plate clamping system, which plate clamping system is located in a corresponding cylinder pit of the plate cylinder (see e.g. International (PCT) Publications Nos. WO 2013/001518 A1, WO 2013/001009 A1 and WO 2013/001010 A2).

Sheets are fed from a sheet feeding group 102 (including a feeder and feeder table) located next to the printing group 101 (on the right-hand side in FIGS. 1 and 2) to a succession of transfer cylinders 103a, 103b, 103c (three cylinders in this example) placed upstream of the blanket cylinders 110, 120. While being transported by the transfer cylinder 103b, the sheets may optionally receive a first impression on one side of the sheets using an additional printing group (not illustrated) as described for instance in U.S. Pat. No. 6,101, 939 and International (PCT) Publication No. WO 2007/042919 A2, transfer cylinder 103b fulfilling the additional function of impression cylinder in such a case. In case the sheets are printed by means of the optional additional printing group, the sheets are first dried by a drying or curing unit 104 before being transferred to the blanket cylinders 110, 120 for simultaneous recto-verso printing.

In the example of FIGS. 1 and 2, the sheets are transferred onto the surface of blanket cylinder 120 where a leading edge of each sheet is held by appropriate gripper means located in cylinder pits between each segment of the blanket cylinder 120. Each sheet is thus transported by the blanket cylinder 120 to the printing nip between the blanket cylinders 110 and 120 where simultaneous recto-verso printing occurs. Once printed on both sides, the printed sheets are then transferred, as known in the art, to a chain gripper system 160 for delivery in a sheet delivery station 180 comprising multiple delivery pile units (three in this example).

In the example of FIGS. 1 and 2, first and second transfer cylinders (not referenced), such as suction drums or cylinders, are interposed between the chain gripper system 160 and the blanket cylinder 120. These first and second transfer cylinders are optional and designed to carry out inspection of the sheets on the recto and verso sides as described in International application No. WO 2007/105059 A1.

FIGS. 3 and 4 illustrate in greater detail one of the inking apparatuses 10, 20 of the printing press shown in FIGS. 1 and 2, namely the uppermost (fourth) inking apparatus 10 on the left-hand side of the printing press 100. While there are differences between the various inking apparatuses 10, 20 in terms of the arrangement and geometry of the relevant components thereof, all inking apparatuses 10, 20 have the same function and basically consist of the same essential elements. In that respect, as illustrated in FIG. 3, each inking apparatus 10, resp. 20, comprises two separate ink ducts 11, 12 supplying ink to an ink roller train 30 which in turns inks the printing plate PP carried by a corresponding one of the plate cylinders 115, resp. 125. More precisely, the ink ducts 11, 12 are both configured as ink fountain devices each comprising an ink supply roller (or duct roller) 13, resp. 14, cooperating with a vibrator roller 15, resp. 16, that is swung back and forth between the ink supply roller 13, resp. 14, and an inking roller 31 of the ink roller train 30. The vibrator rollers 15, 16 are typically made of a metallic inner core which is provided with an outer coating made e.g. of rubber, polymer or of any other material exhibiting suitable mechanical and ink-transfer properties.

In the example of FIGS. 1 to 4, the two vibrator rollers 15, 16 cooperate with one and a same inking roller 31 of the ink roller train 30. The inking apparatus could however be configured in such a way that the two vibrator rollers 15, 16 cooperate with distinct inking rollers of the ink roller train (see e.g. FIG. 16 where the two vibrator rollers 15, 16 respectively cooperate with a first inking roller 31* and a second inking roller 32* of the ink roller train 30*).

As further illustrated in FIG. 3, each inking apparatus 10, resp. 20, may optionally be configured for wet-offset printing, in which case a suitable dampening system 40 is provided to apply dampening solution onto the surface of a suitable wet-offset printing plate PP. In the case of dry-offset printing, the dampening system 40 is omitted, it being to be understood that dry-offset printing plates PP as used for the production of security documents are basically configured as letterpress printing plates with raised printing areas.

As further illustrated in FIG. 4, each ink duct 11, resp. 12 further comprises an ink fountain blade 11a, resp. 12a, that is adjusted with respect to the circumference of the relevant ink supply roller 13, resp. 14, so as to leave a determined spacing which defines the ink film thickness on the ink supply roller 13, resp. 14, i.e. the amount of ink that is transferred downstream to the vibrator roller 15, resp. 16, and then to the ink roller train 30 (or 30*), which spacing is typically adjustable. In such known inking apparatuses, adjustment of the spacing is typically carried out in individual ink zones by means of a number of ink keys that are distributed axially along the length of the corresponding ink supply roller and are individually adjustable.

In an inking apparatus of the aforementioned type, ink is fed intermittently from the relevant ink duct 11, resp. 12, via the vibrator roller 15, resp. 16. This vibrator roller 15, resp. 16, receives a relatively wide ink stripe from the corresponding ink supply roller 13, 14 and transfers part of this ink stripe to the inking roller 31 (resp. 31*, 32*) of the ink roller train 30 (resp. 30*).

In applications where a single ink duct and single vibrator roller are used, the vibrator roller typically exhibits a smooth and uniform outer surface. In contrast, in applications where two ink ducts and two vibrator rollers are used (as in the example of FIGS. 1 to 4), the vibrator rollers are typically structured in the axial direction so as to exhibit corresponding annular sections designed to transfer ink only in certain axially-distributed zones (see e.g. International (PCT) Publication No. WO 2014/056711 A1 or European Patent Publications Nos. EP 1 149 699 A2 and EP 1 738 907 A2).

The amount of ink transferred to the printing plate PP can be adjusted by means of each vibrator roller 15, resp. 16, namely by adjusting the frequency at which the vibrator roller 15, resp. 16, swings back and forth between the ink supply roller 13, resp. 14, and the inking roller 31 (resp. 31*, 32*), and/or by adjusting the amount of time (or "dwell") the vibrator roller 15, resp. 16, runs in contact with the ink supply roller 13, resp. 14, thereby increasing the width/length of the relevant ink stripe in the circumferential direction.

In the known solutions, the amount of ink transferred to the printing plate is typically further adjusted by means a number of so-called ink keys provided at the extremity of the ink fountain blade, which ink keys are distributed along the axial length of the relevant ink supply roller to allow individual adjustment of the spacing between the ink fountain blade and the circumference of the ink supply roller. In the offset printing press of FIGS. 1 to 4, there are typically twenty-eight such ink keys, each having a width (along the axial direction) of the order of 30 mm. Each such ink key can be adjusted individually so as to alter the amount of ink in corresponding ink zones that are distributed along the axial direction of the relevant ink supply roller (see e.g. International (PCT) Publication No. WO 2012/049610 A1). Inking apparatuses using such ink zone systems are widely used in the art and are for instance marketed by Koenig & Bauer AG under the product designation ColorTronic.

In the context of the production of security documents, such as banknotes, individual sheets (or successive portions of a continuous web) are typically printed in such a way as to exhibit a matrix arrangement of repetitive imprints arranged in multiple columns and rows (m×n). FIG. 5 schematically illustrates a printed sheet S as used in the context of the production of banknotes and like security documents, which printed sheet S typically has a width W, in a direction x (hereinafter referred to as the "axial direction") transversely to the path of the sheets S through the printing press as identified by the arrow in FIG. 5, of 820 mm and a length L, in a direction y (hereinafter referred to as the "circumferential direction" y) parallel to the path of the sheets S through the printing press, of 700 mm.

As already mentioned, the printed sheet S is printed so as to exhibit, within an effective printed area E, a matrix arrangement of multiple imprints P arranged side by side in multiple rows and columns. In the illustrated example, forty imprints P are printed in the effective printed area E in a matrix arrangement of eight (n=8) rows and five (m=5) columns, each imprint P exhibiting certain dimensions L1 (in the axial direction x) and L2 (in the circumferential direction y).

A limitation with the known inking apparatuses resides in the fact that the relevant arrangement and dimensions of the imprints P (which may vary from one case to another) do not precisely match the ink zone subdivision of the relevant inking apparatus, which ink zone subdivision is determined once and for all by the corresponding ink zone system. In particular, as soon as the length L1 of the imprints P differs from an integer multiple of the ink zone width, a mismatch between the ink zone subdivision and the relevant layout of imprints P occurs and ink key settings therefore need to be adjusted differently for each column of imprints P. This in turn means that an operator is faced with the task of finding appropriate ink key settings to adjust the inking in the relevant ink zones so that no major differences occurs in the inking between adjacent columns of imprints P, which adjustment process is time-consuming.

Furthermore, the operator is forced in practice to make compromises in the inking as it is not possible to adjust the inking independently and separately for each column of imprints P. Compromises in particular have to be made in the regions where two adjacent columns of imprints P meet. This is schematically illustrated by FIG. 6 which illustrates adjacent (columns of) imprints P, P', P'' and an illustrative ink zone subdivision (with ink zones $Z_A$ to $Z_K$) that does not precisely match the length L1 of the imprints P, P', P'', it being to be understood that the ink zone subdivision thus differs from one column of imprints P, P', P'' to another.

In that respect, considering for instance a pattern A within the column of imprints P, the ink key settings for ink zones $Z_D$ and $Z_E$ where the pattern A is located are necessarily different from the ink key settings for ink zones $Z_J$ and $Z_K$ where the same pattern A is located in the adjacent column of imprints P'. The same is true with respect to pattern B within the column of imprints P which is covered by three ink zones in this illustrative example, namely ink zones $Z_G$ to $Z_I$ and the same pattern B within the adjacent column of imprints P'' which is covered by four ink zones, namely ink zones $Z_A$ to $Z_D$.

In practice, with the known solutions, it is not therefore possible to achieve an optimum inking of the relevant printing plates and obtain an optimal printed result. Furthermore, finding the best possible ink settings takes considerable time which negatively affects production costs and efficiency.

There is therefore a need for an improved solution.

SUMMARY OF THE INVENTION

A general aim of the invention is therefore to improve the known inking apparatuses of the type relying upon the use of at least one vibrator roller for the intermittent transfer and supply of ink.

More precisely, an aim of the present invention is to provide such a solution that allows a better and more uniform control of the inking.

Yet another aim of the present invention is to provide such a solution that facilitates the job of an operator in making the necessary adjustments of the inking in a printing press.

These aims are achieved thanks to the inking apparatus defined in the claims.

There is accordingly provided an inking apparatus of a printing press, in particular an offset or letterpress printing press, comprising at least one ink duct with an ink supply roller, an ink roller train comprising at least one inking roller which receives ink from the at least one ink duct, and at least one vibrator roller interposed between the ink supply roller and the inking roller, which vibrator roller is swung back and forth between the ink supply roller and the inking roller and intermittently transfers ink from the ink supply roller to the inking roller. According to the invention, a circumference of the vibrator roller exhibits an ink-transfer structure which reflects a desired inking profile of a printing plate to be inked by the inking apparatus and is designed to modulate a quantity of ink transferred by the vibrator roller. The ink-transfer structure on the circumference of the vibrator roller is subdivided, in a circumferential direction of the vibrator roller, into an integer number of individual ink-transfer portions that are repeated with a determined circumferential period in the circumferential direction, each individual ink-transfer portion reflecting the desired inking profile of the printing plate to be inked by the inking apparatus. Furthermore, a contact length over which the vibrator roller runs in contact with the ink supply roller is equivalent to the determined circumferential period of the individual ink-transfer portions or to an integer multiple of the determined circumferential period of the individual ink-transfer portions.

The integer number of individual ink-transfer portions that are repeated in the circumferential direction is advantageously lower or equal to 10, preferably within a range of 4 to 6.

Preferably, the ink-transfer structure on the circumference of the vibrator roller is a structured outer layer that is directly formed onto a circumference of a cylindrical core of the vibrator roller or a structured surface of an exchangeable plate or sleeve medium carried by a cylindrical body of the vibrator roller.

In accordance with a preferred embodiment of the invention, the ink-transfer structure on the circumference of the vibrator roller is a relief structure exhibiting raised ink-transfer areas. In this context, at least the ink-transfer structure may advantageously be a 3D-printed structure.

The ink-transfer structure on the circumference of the vibrator roller may advantageously be structured in such a way that the ink-transfer structure guarantees a continuous and uninterrupted circumferential support upon contacting the ink supply roller or the inking roller. This ensures proper frictional engagement of the vibrator roller with the ink supply roller (and the inking roller) irrespective of the position where the two rollers get into contact with each other. This can for instance be ensured by the provision of at least one continuous support portion extending in the circumferential direction over the circumference of the vibrator roller.

In one embodiment of the invention, the ink-transfer structure is subdivided, in an axial direction of the vibrator roller, into an integer number of individual ink-transfer sections that are repeated with a determined axial period in the axial direction. This allows proper adjustment of the quantity of ink along the axial direction of the printing plate in case of printing of individual imprints arranged in a matrix of rows and columns, such as in the case of the production of security documents, in particular banknotes. Such a subdivision of the ink-transfer structure in the axial direction is not necessary in the event that a single imprint or single column of imprints is printed on the sheets or web.

In such case, the ink-transfer structure will exhibit a single ink-transfer section in the axial direction.

The at least one ink duct may advantageously be an ink fountain device comprising an ink fountain blade cooperating with the ink supply roller, which ink fountain blade is positioned with respect to a circumference of the ink supply roller to leave a selected spacing between the ink fountain blade and the circumference of the ink supply roller. In this context, the selected spacing between the ink fountain blade and the circumference of the ink supply roller can be adjustable, preferably uniformly over an entire axial length of the ink supply roller.

In accordance with an advantageous embodiment of the invention, the inking apparatus comprises (i) a first ink duct with a first ink supply roller, (ii) a first vibrator roller interposed between the first ink supply roller and a first inking roller of the ink roller train, which first vibrator roller is swung back and forth between the first ink supply roller and the first inking roller and intermittently transfers ink from the first ink supply roller to the first inking roller, (iii) a second ink duct with a second ink supply roller, and (iv) a second vibrator roller interposed between the second ink supply roller and the first inking roller, which second vibrator roller is swung back and forth between the second ink supply roller and the first inking roller and intermittently transfers ink from the second ink supply roller to the first inking roller. In this context, a circumference of the first vibrator roller exhibits a first ink-transfer structure which reflects a first part of the desired inking profile and is designed to modulate a quantity of ink transferred by the first vibrator roller, while a circumference of the second vibrator roller exhibits a second ink-transfer structure which reflects a second part of the desired inking profile and is designed to modulate a quantity of ink transferred by the second vibrator roller.

In accordance with a further embodiment of the invention, the inking apparatus comprises (i) a first ink duct with a first ink supply roller, (ii) a first vibrator roller interposed between the first ink supply roller and a first inking roller of the ink roller train, which first vibrator roller is swung back and forth between the first ink supply roller and the first inking roller and intermittently transfers ink from the first ink supply roller to the first inking roller, (iii) a second ink duct with a second ink supply roller, and (iv) a second vibrator roller interposed between the second ink supply roller and a second inking roller of the ink roller train, which second vibrator roller is swung back and forth between the second ink supply roller and the second inking roller and intermittently transfers ink from the second ink supply roller to the second inking roller. In this context, a circumference of the first vibrator roller likewise exhibits a first ink-transfer structure which reflects a first part of the desired inking profile and is designed to modulate a quantity of ink transferred by the first vibrator roller, while a circumference of the second vibrator roller exhibits a second ink-transfer structure which reflects a second part of the desired inking profile and is designed to modulate a quantity of ink transferred by the second vibrator roller.

The ink roller train of the inking apparatus of the invention may further include at least one distribution roller oscillating in an axial direction, which is of particular interest for the production of so-called iris or rainbow effects.

There is also claims a printing press comprising an inking apparatus according to the invention. Such a printing press may in particular be an offset printing press, preferably an offset printing press for simultaneous recto-verso printing of security documents.

The present invention also relates to a method of producing a vibrator roller suitable for use as the at least one vibrator roller of the inking apparatus of the invention, which method comprises the steps of (a) providing a desired inking profile of the printing plate to be inked, and (b) forming, on a circumference of the vibrator roller, an ink-transfer structure which reflects the desired inking profile and is designed to modulate a quantity of ink transferred by the vibrator roller, the ink-transfer structure on the circumference of the vibrator roller being subdivided, in a circumferential direction of the vibrator roller, into an integer number of individual ink-transfer portions that are repeated with a determined circumferential period in the circumferential direction, each individual ink-transfer portion reflecting the desired inking profile of the printing plate to be inked.

Step (b) may include structuring an outer layer that is directly formed onto a circumference of a cylindrical core of the vibrator roller. Alternatively, step (b) may include structuring a surface of an exchangeable plate or sleeve medium to be carried by a cylindrical body of the vibrator roller.

Advantageously, the ink-transfer structure is formed as a relief structure exhibiting raised ink-transfer areas. Preferably, at least the ink-transfer structure is produced by 3D-printing.

In accordance with a preferred embodiment of the invention, the desired inking profile of the printing plate to be inked is derived from prepress data of the relevant printing plate to be inked, such as for example prepress data complying with the CIP3 Print Production Format.

Further advantageous embodiments of the invention form the subject-matter of the dependent claims and are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

The present invention will be described in the particular context of a sheet-fed offset printing press for simultaneous recto-verso printing of sheets as typically used for the production of security documents, such as banknotes, which printing press comprises individual vibrator-type inking apparatuses as already discussed in the preamble hereof with reference to FIGS. 1 to 4 (and 16). The invention is however applicable to any printing press that likewise relies upon the use of vibrator-type inking apparatuses, i.e. any printing press having at least one inking apparatus that comprises (i) at least one duct with an ink supply roller, (ii) an ink roller train comprising at least one inking roller which receives ink from the at least one duct, and (iii) at least one vibrator roller interposed between the ink supply roller and the inking roller, which vibrator roller is swung back and forth between the ink supply roller and the inking roller and intermittently transfers ink from the ink supply roller to the inking roller.

As this will be appreciated from the following description of various embodiments of the invention, a key element of the invention resides in the provision, on the circumference of the vibrator roller, of an ink-transfer structure which reflects a desired inking profile of a printing plate to be inked by the inking apparatus, which ink transfer structure is designed to modulate a quantity of ink transferred by the vibrator roller.

Figure 1:
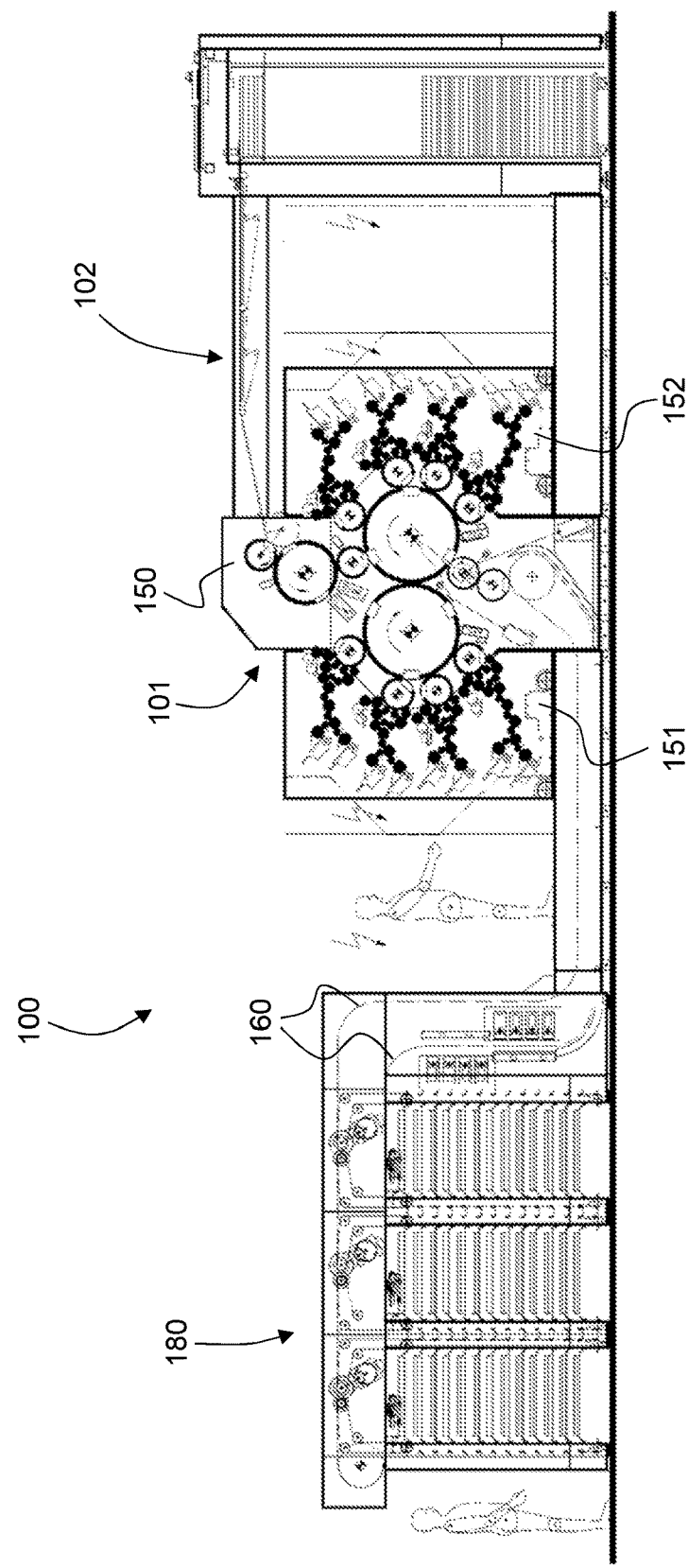
FIG. 1 is a schematic side view of a printing press designed for simultaneous recto-verso printing of sheets as typically used for the production of security documents, such as banknotes.
Figure 2:
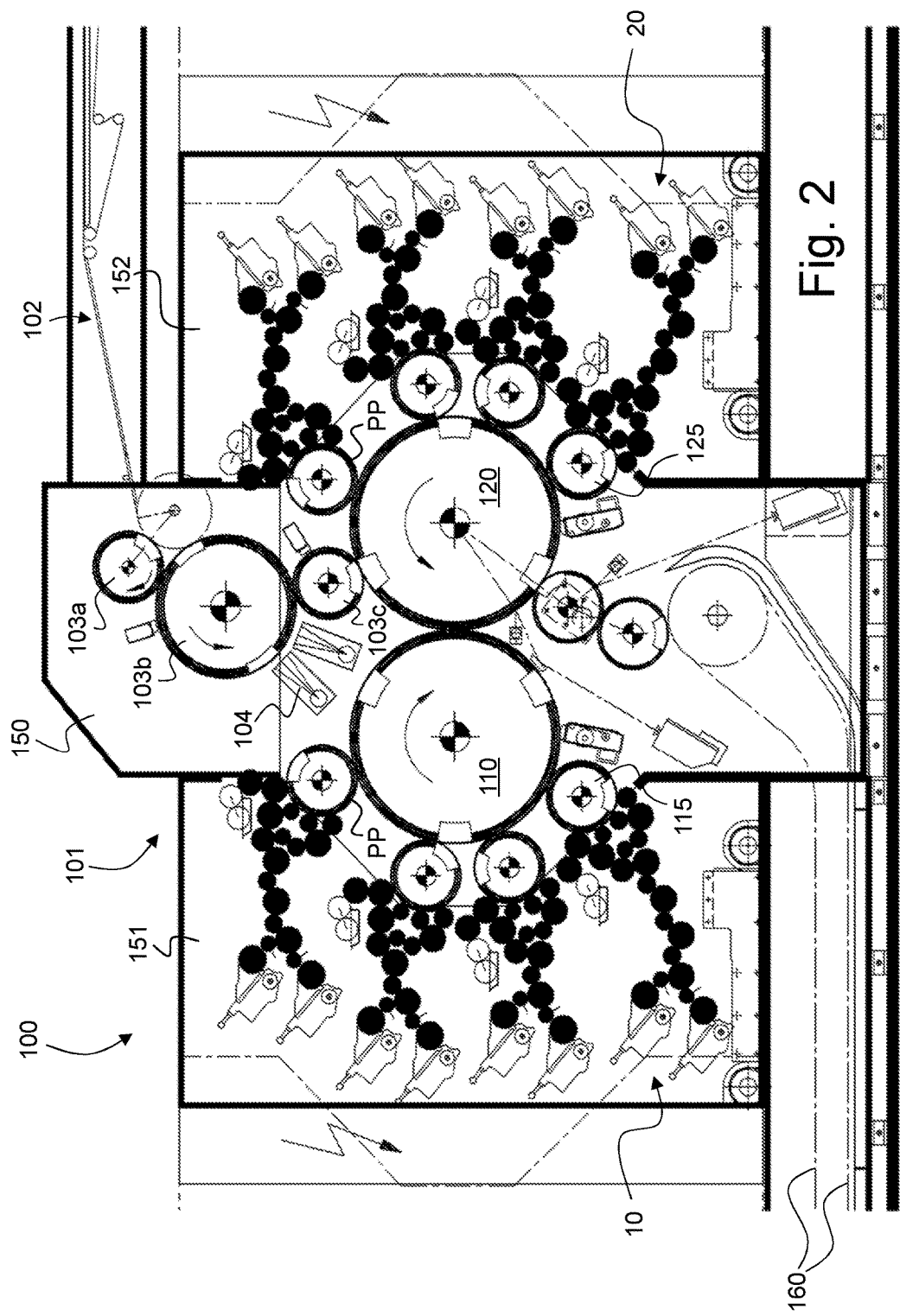
FIG. 2 is a schematic partial side view of the printing group of the printing press of FIG. 1.
Figure 7:
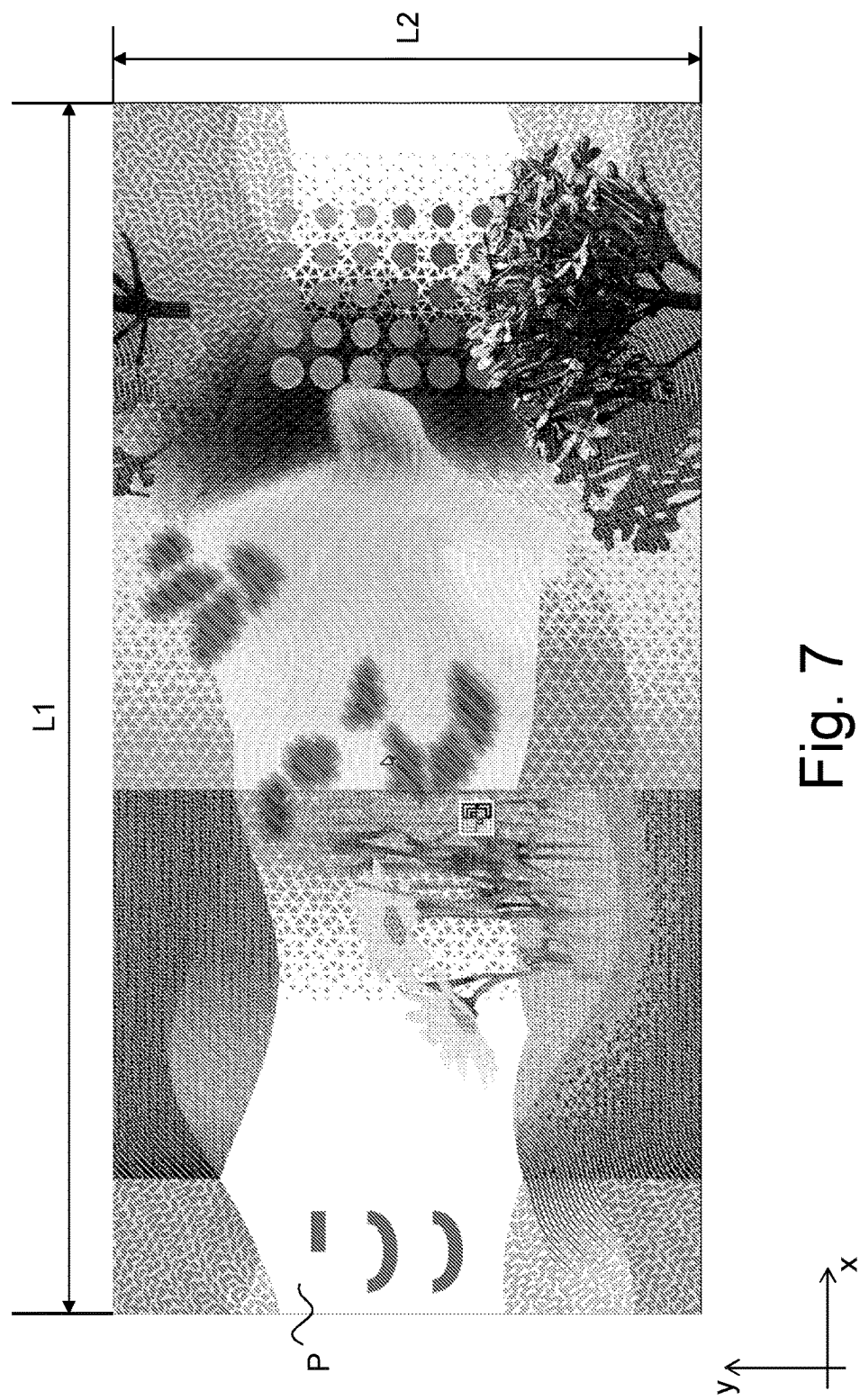
FIG. 7 is a view of a particular composite offset background of an illustrative banknote design as printable on a printing press of the type shown in FIGS. 1 and 2.

FIG. 7 schematically illustrates an illustrative example of a composite offset background forming an imprint P of a particular banknote design (recto/front side only) that is typically printable on a printing press of the type illustrated in FIGS. 1 and 2. It is to be understood that the particular banknote design includes another composite offset background that is printed on the verso/back side of the sheets (which occurs simultaneously to the printing of the recto side of the sheets in the example of FIGS. 1 and 2). Such a composite offset background typically consists of a multiplicity of individual offset prints that are printed in register with one another in different ink colours. With a printing press of the type illustrated in FIGS. 1 and 2, at least four distinct printing plates are used to print the recto (front) side of the sheets, which means that the particular composite offset background is formed in such case of four individual patterns that are printed in register with one another. As this has already been mentioned in the preamble hereof, an additional printing group could optionally be provided on top of the offset printing press of FIGS. 1 and 2, upstream of the main printing group, thereby increasing the number of printing plates (and accordingly the number of individual patterns) that are used to print the recto (front) side of the sheets (see in particular U.S. Pat. No. 6,101,939 and International (PCT) Publication No. WO 2007/042919 A2 which are also incorporated herein by reference in their entirety). In any event, the number of individual printing plates used to print a particular design is not as such important in the context of the present invention.

Figure 5:
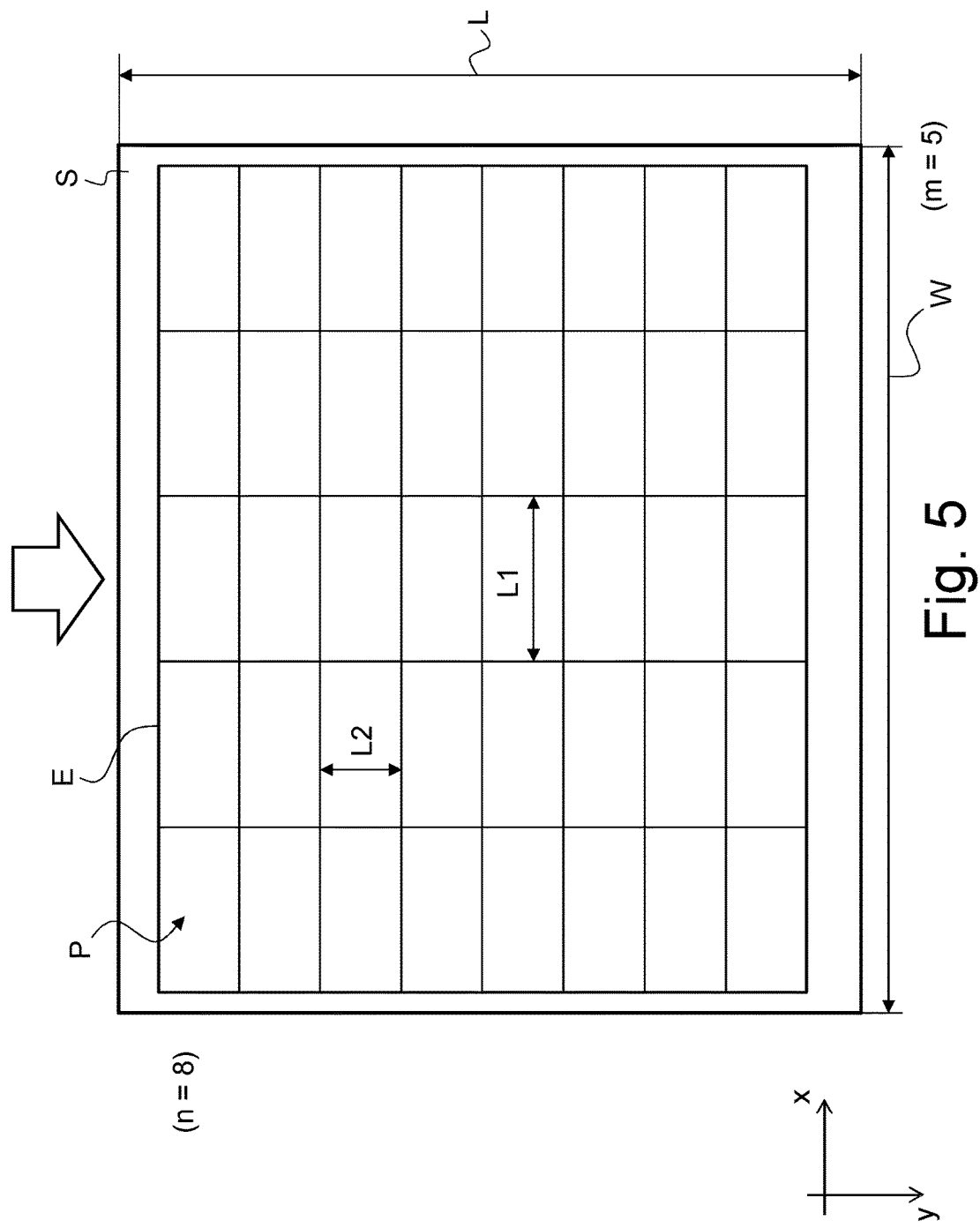
FIG. 5 is a schematic view of an illustrative printed sheet as used in the context of the production of security documents, such as banknotes.

It will further be understood that the composite offset background that is actually printed on the sheets consists of a repetition of the composite offset background illustrated in FIG. 7 in accordance with the particular matrix arrangement of m×n imprints P (as for instance shown in FIG. 5, where m=5 and n=8 by way of a non-limiting illustrative example).

Figure 8:
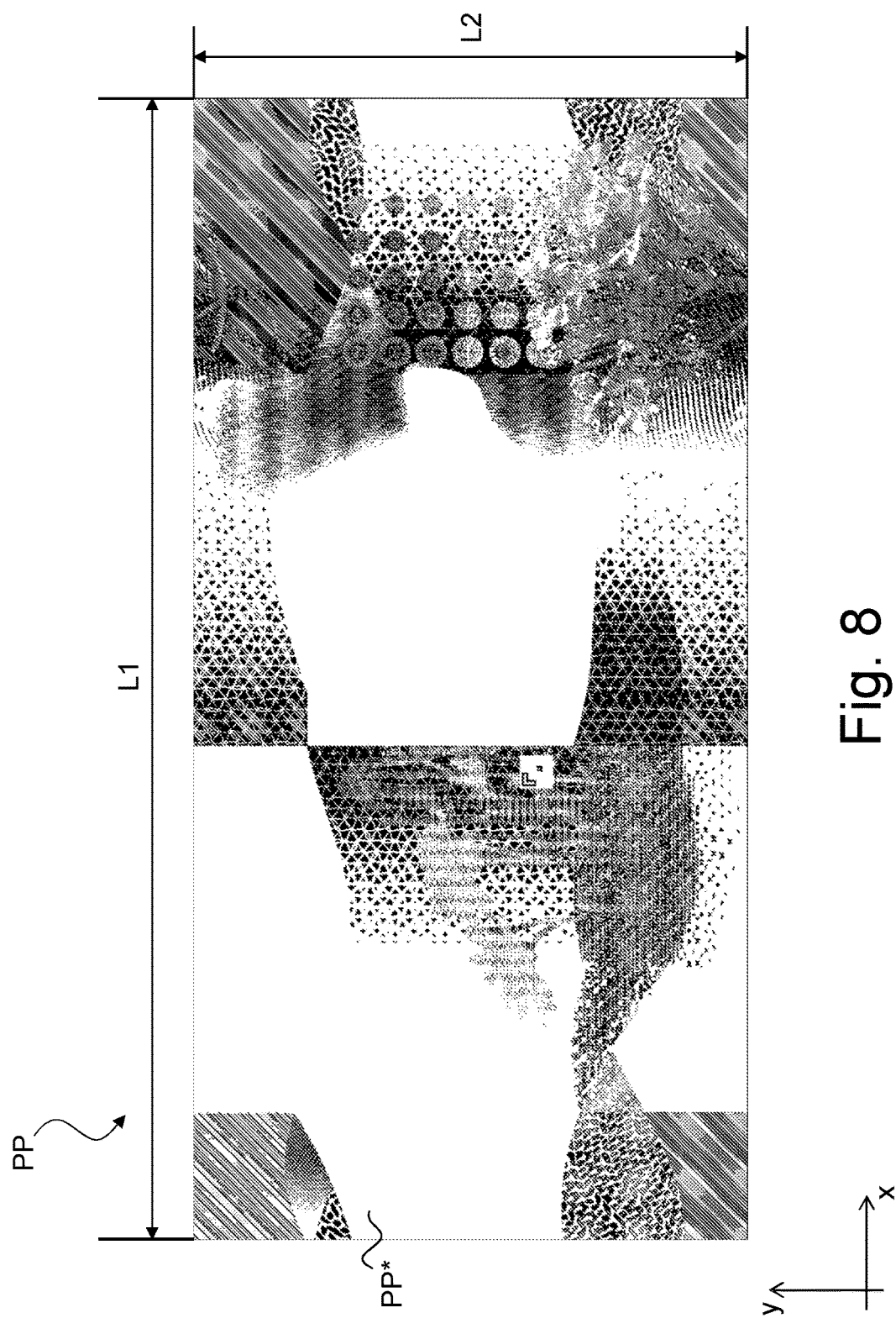
FIG. 8 is an illustrative view of a portion of a printing plate used to print part of the composite offset background of FIG. 7.

FIG. 8 illustrates one corresponding portion PP* of a printing plate PP used to produce part of the composite offset background of FIG. 7. This can be any suitable printing plate PP (whether for wet-offset or dry-offset printing) that is mounted on any one of the plate cylinder 115 (or 125 as the case may be) illustrated in FIGS. 1 to 3.

In the particular example, such printing plate PP could be inked using a single one of the ducts 11, 12 or both ducts 11, 12, in which case two (or more) different inks are used to ink corresponding portions of the printing plate PP. For the purpose of the discussion of a first embodiment of the invention, it will be assumed that a single duct (e.g. duct 11 of FIG. 3) is used to ink the printing plate PP with a single ink. It will however be appreciated that the invention is applicable irrespective of the number of inks used to ink the relevant printing plate PP.

Figure 9:
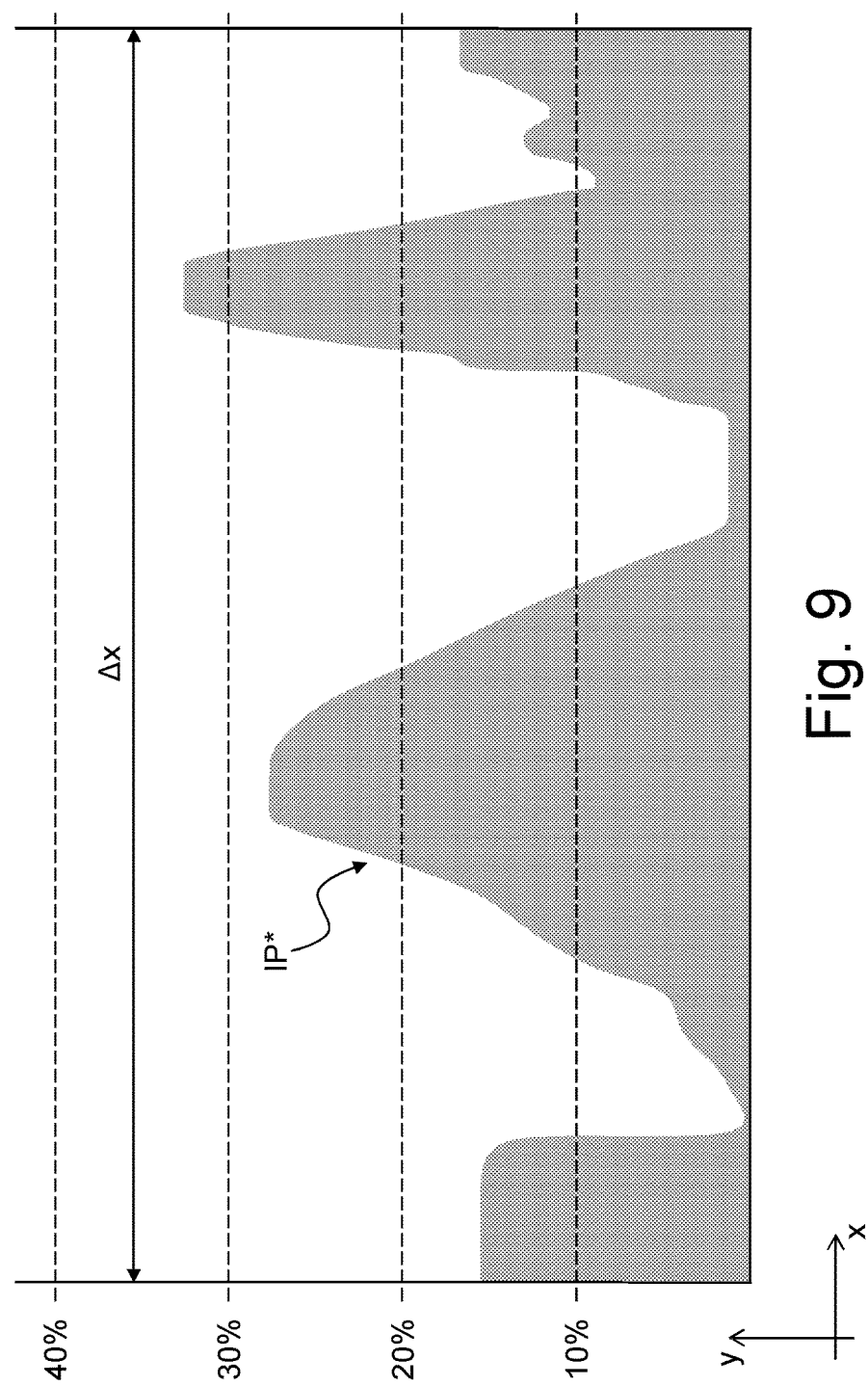
FIG. 9 is a schematic view illustrating a desired inking profile corresponding to the portion of the printing plate of FIG. 8 to be inked to produce the relevant part of the composite offset background of FIG. 7.
Figure 10:
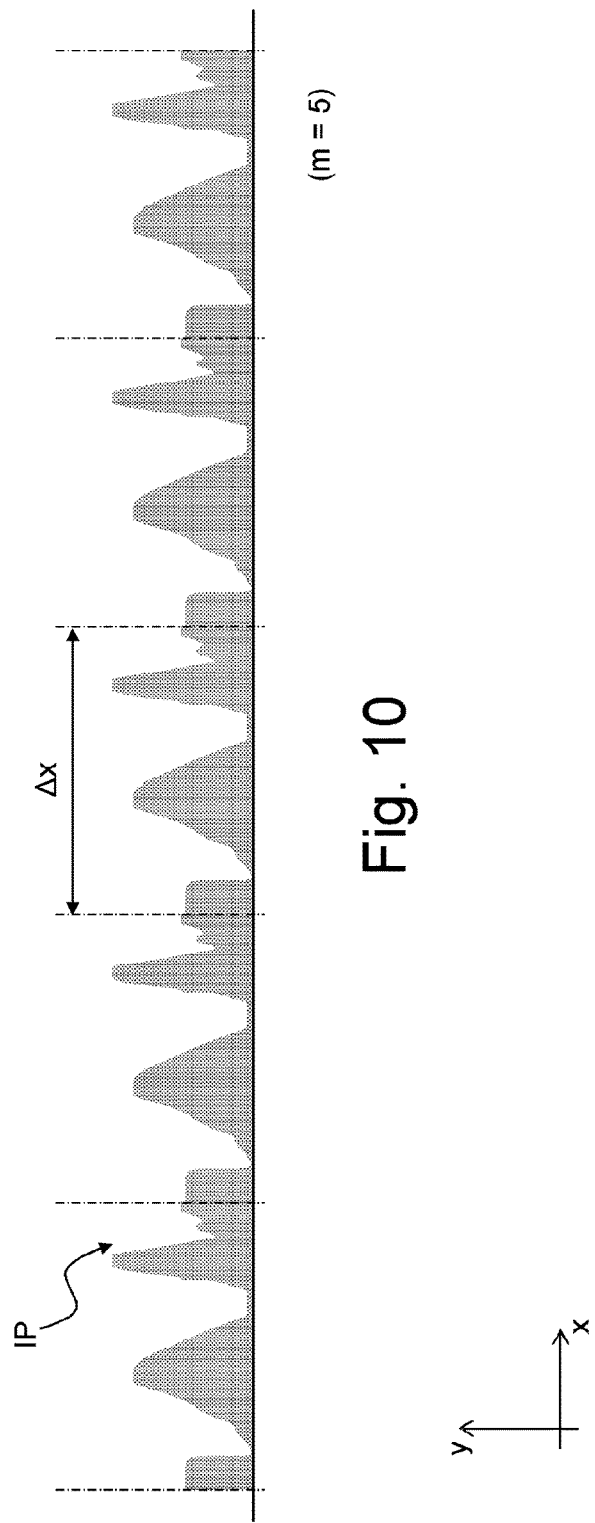
FIG. 10 is an illustrative view of the desired inking profile of FIG. 9 which is repeated along the entire width of the printing plate to be inked.

FIG. 9 illustrates a desired inking profile IP* corresponding to the particular portion PP* of the printing plate PP to be inked shown in FIG. 8. FIG. 9 only illustrates the inking profile for one given imprint position along the axial direction x, but it will be appreciated that the desired inking profile of the entire printing plate PP is basically a repetition of the inking profile IP* of FIG. 9 an integer number m of times (m being equal to the number of columns of imprints P to be printed as shown in FIG. 5). This is schematically illustrated by FIG. 10 where the desired inking profile IP of the entire printing plate PP consists of a repetition of the inking profile IP* shown in FIG. 9 five times along the axial direction x in the particular example. It will be appreciated that the repetition period (or axial period) Δx of the inking profile IP corresponds to dimension L1 of the relevant imprint P.

It shall be appreciated that the desired inking profile is a function of each particular design and that the desired inking profile IP*, IP shown in the Figures is accordingly to be regarded as a purely illustrative example. Advantageously, such an inking profile can be derived from typical prepress data of the relevant printing plate, such as for example prepress data complying with the CIP3 Print Production Format that is widely used in the art. In the context of the present invention, it suffices to understand that the desired inking profile IP is basically a representation of the relevant amount of ink that is required to ink any given printing plate PP, which quantity is dependent upon the particular design to ink on the printing plate PP. As schematically shown in FIG. 9, the desired inking profile IP typically exhibits peaks indicative of where a high amount of ink is required to ink the printing plate PP and depressions indicative of where a comparatively lower amount of ink is required to ink the printing plate PP.

Figure 3:
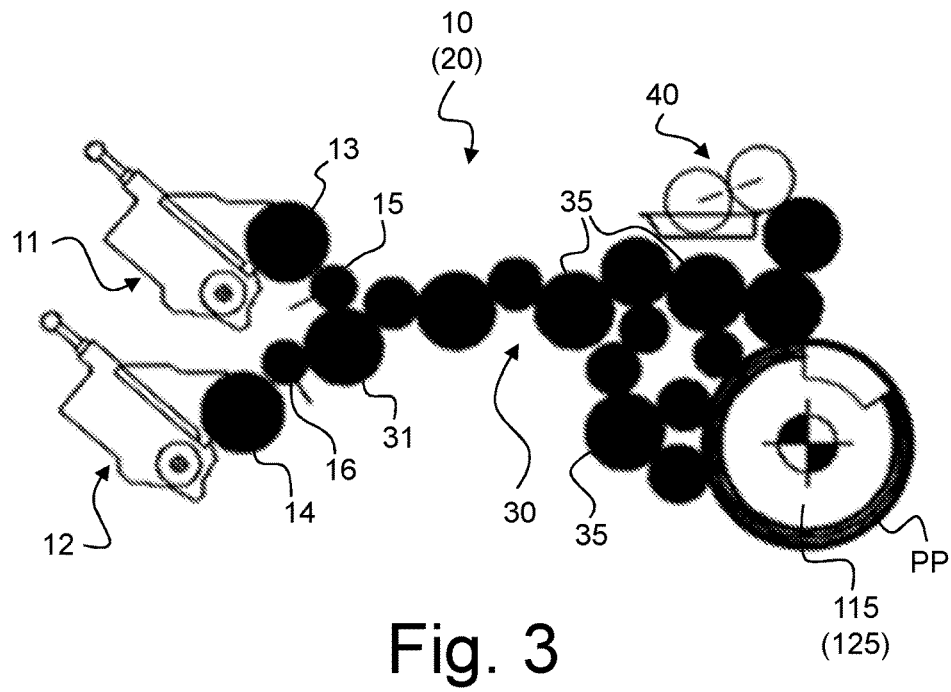
FIG. 3 is a schematic side view of one of the inking apparatuses of the printing press of FIGS. 1 and 2, namely the uppermost (fourth) inking apparatus on the recto (front) side.
Figure 4:
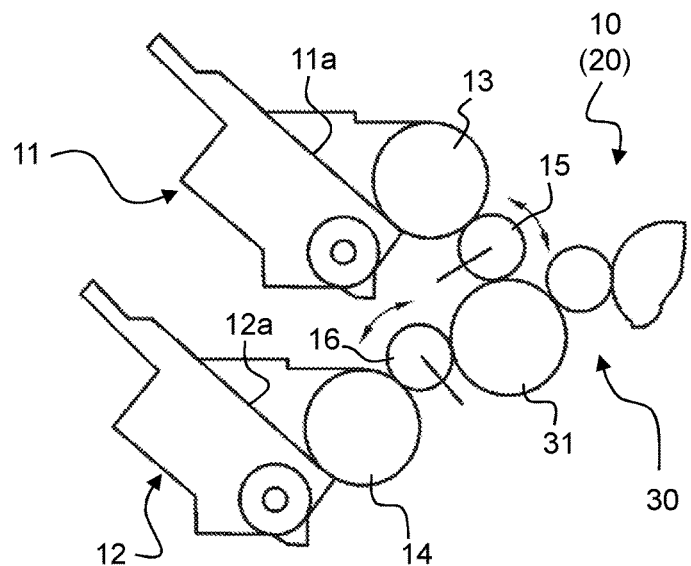
FIG. 4 is a more detailed side view of the upstream end of the inking apparatus of FIG. 3.

In accordance with the present invention, the printing plate PP is inked by means of an inking apparatus having basically the same configuration as known in the art, namely a vibrator-type inking apparatus as for instance shown in FIGS. 3 and 4. In contrast to the know solutions, the printing plate PP is however inked in such a way as to substantially match the desired inking profile IP of that particular printing plate PP.

Figure 6:
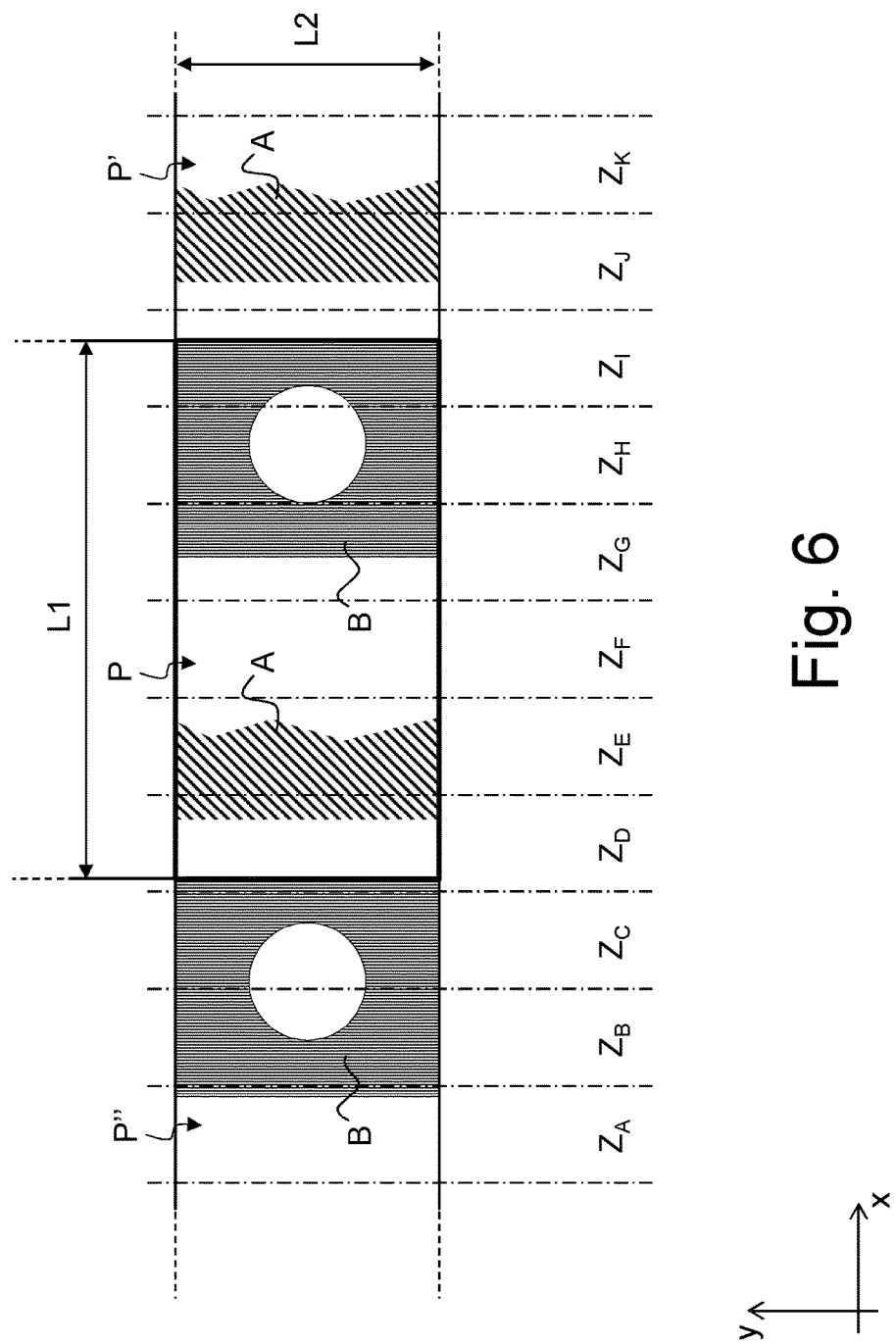
FIG. 6 is a partial view of individual illustrative imprints and of a corresponding ink zone subdivision.

As already mentioned in the preamble hereof, the known inking apparatuses typically rely upon a so-called ink zone system with individual ink zones and adjustable ink keys having a certain specified width in the axial direction (e.g. 30 mm—see again FIG. 6), which means that a precise inking profile cannot be achieved. Furthermore, in the particular case of the production of security documents which are printed in the form of a matrix arrangement of imprints as shown in FIG. 5, each relevant column of imprints typically requires different ink key settings, which leads the operator to make compromises in the inking of the printing plate.

In accordance with the present invention, each printing plate PP can be precisely inked in accordance with the desired inking profile IP of that relevant printing plate PP. This is achieved by using an inking apparatus of the aforementioned type where the circumference of the vibrator roller exhibits an ink-transfer structure which reflects the desired inking profile IP of the relevant printing plate PP to be inked by the inking apparatus, which ink-transfer structure is designed to modulate the quantity of ink transferred by the vibrator roller. In other words, according to the invention, the ink-transfer structure on the circumference vibrator roller is exploited to precisely define and modulate the quantity and distribution of ink to be supplied to the printing plate in dependence of the desired inking profile of that printing plate.

Figure 11:
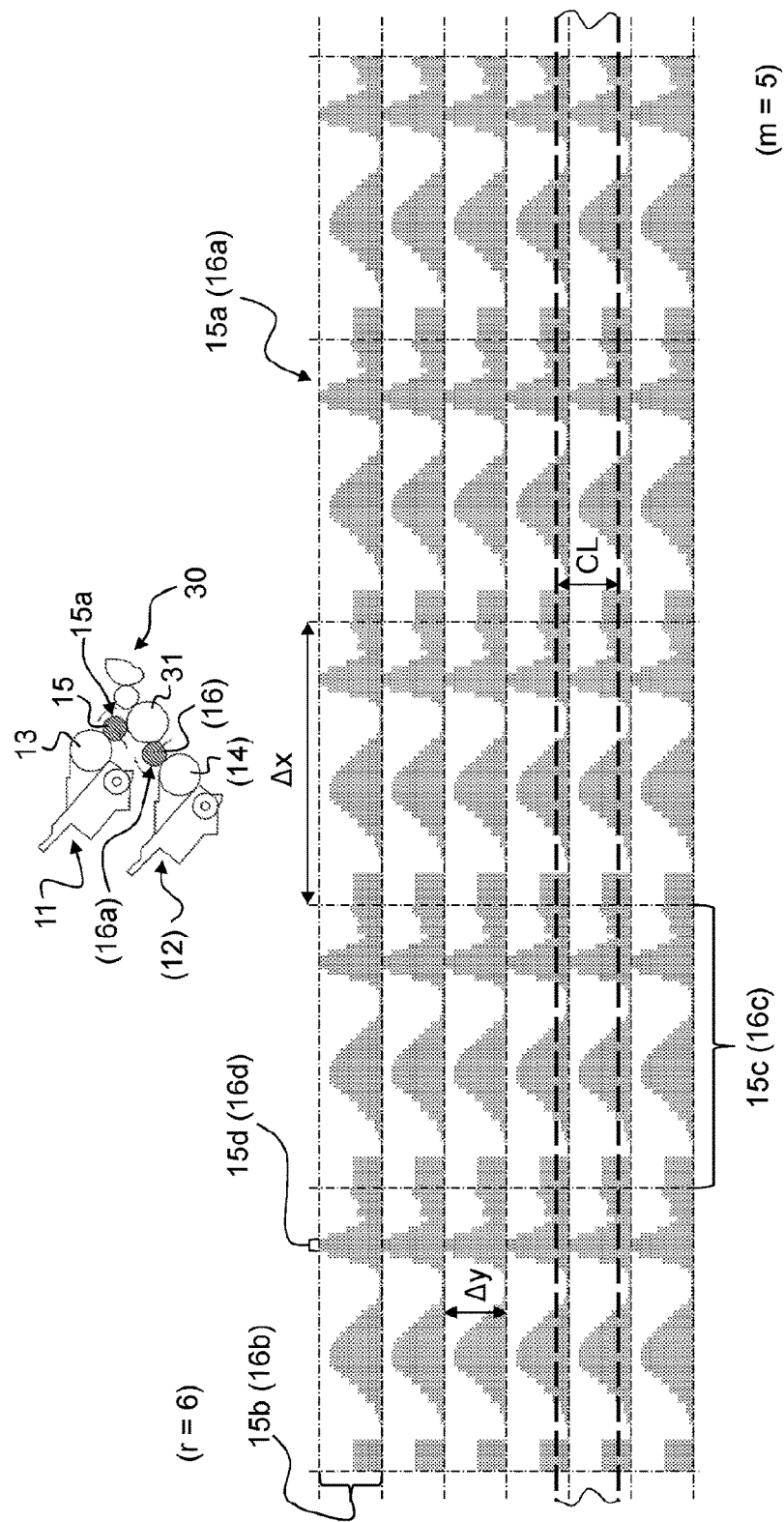
FIG. 11 is an illustrative view of a corresponding ink transfer structure to be provided on a circumference of one vibrator roller of the inking apparatus of the printing press in accordance with a first embodiment of the present invention, which ink transfer structure is representative of the inking profile of FIG. 10.

FIG. 11 illustrates an example of an ink transfer structure that could be provided on the circumference of one of the vibrator rollers 15, 16 of the inking apparatus of FIGS. 3 and 4 in accordance with a first embodiment of the invention. The relevant ink transfer structure is generally designated by reference numeral 15a or 16a depending on whether the relevant structure is provided on the circumference of vibrator roller 15 or vibrator roller 16 and reflects the desired inking profile IP shown in FIG. 10. For the sake of the discussion, it will be assumed that only one ink duct is used for inking the relevant printing plate PP (i.e. either ink duct 11 or ink duct 12).

Figure 12:
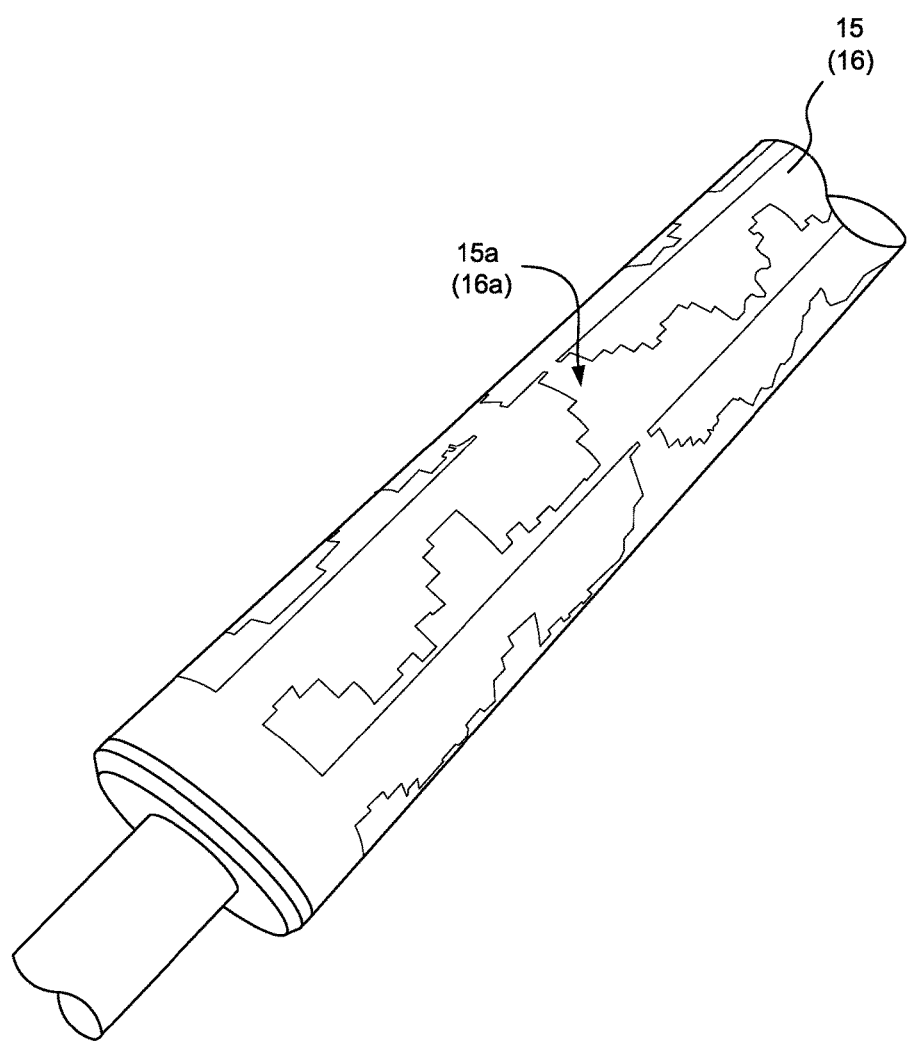
FIG. 12 is a greyscale photographic illustration of a vibrator roller provided with an example of the ink transfer structure of the present invention.

The ink transfer structure 15a (16a) provided on the circumference of the vibrator roller 15 (16) is preferably a relief structure exhibiting raised ink-transfer areas (shown as grey areas in FIG. 11), which relief structure comes into contact with the typically smooth surface of the associated ink supply roller 13 (14). The ink transfer structure 15a (16a) could be any other suitable structure that can perform a selective transfer of ink upon contacting the circumference of the associated ink supply roller 13 (14), such as a structure having ink-accepting and ink-repelling zones. A photographic illustration of a vibrator roller 15 (16) provided with a relief structure acting as the ink transfer structure 15a (16a) is shown in FIG. 12.

As schematically shown in FIG. 11, the ink-transfer structure 15a (16a) on the circumference of the vibrator roller 15 (16) is subdivided, in a circumferential direction y of the vibrator roller 15 (16), into an integer number r of individual ink-transfer portions 15b (16b) that are repeated with a determined circumferential period Δy in the circumferential direction y, each individual ink-transfer portion 15b (16b) reflecting the desired inking profile IP of the printing plate PP to be inked by the inking apparatus. In the illustrated example, six (r=6) individual ink-transfer portions 15b (16b) are repeated in the circumferential direction y, the determined circumferential period Δy being equivalent to the circumferential length of the vibrator roller 15 (16), i.e. π times the relevant diameter of the vibrator roller 15 (16), divided by integer number r. Assuming for instance a vibrator roller 15 (16) having a nominal outer diameter of 60 mm, the circumferential period Δy is equivalent in the illustrated example to approximately 31.416 mm.

In an extreme case, integer number r could be equal to 1, meaning that the relevant ink-transfer structure 15a (16a) on the circumference of the vibrator roller 15 (16) would include only one ink-transfer portion 15b (16b). In practice however, the number r of individual ink-transfer portions 15b (16b) is preferably greater than one. Integer number r may advantageously be lower or equal to 10, even more preferably in the range of 4 to 6.

In accordance with the present invention, a contact length over which the vibrator roller 15 (16) runs in contact with the ink supply roller 13 (14) is equivalent to the determined circumferential period Δy of the individual ink-transfer portions 15b (16b) or to an integer multiple of the determined circumferential period Δy of the individual ink-transfer portions 15b (16b). This contact length is schematically illustrated in FIG. 11 as a horizontal band having dimension CL in the circumferential direction y. In the illustrated example, the contact length CL is selected to be equivalent to the determined circumferential period Δy.

The desired contact length CL can be selected by operating the relevant ink supply roller 13 (14) so as to rotate intermittently with a specified rate (or "sweep") corresponding to the desired contact length CL, the vibrator roller 15 (16) being driven into rotation by friction under the action of the relevant ink supply roller 13 (14) when both rollers are in contact with each other.

Thanks to the above solution, and irrespective of the particular position on the circumference of the vibrator roller 15 (16) where the vibrator roller 15 (16) comes into contact with the associated ink supply roller 13 (14), the vibrator roller 15 (16) will carry and transfer a partial ink "stripe" that is modulated in dependence of the relevant ink transfer structure 15a (16a). More precisely, in the illustrated example where the contact length CL is equal to the circumferential period Δy, the vibrator roller 15 (16) will in each case take up a certain quantity of ink that precisely matches the relevant profile defined by each individual ink-transfer portion 15b (16b). Should the contact length CL be increased to e.g. twice the circumferential period Δy, then twice the amount of ink will be taken up by the vibrator roller 15 (16).

The exact number r of individual ink-transfer portions 15b (16b) is selected on the basis of the particular inking requirements, it being to be understood that an increase in the number r of individual ink-transfer portions 15b (16b) means a shorter ink stripe and contact length CL (in the circumferential direction y), and therefore a decrease in the amount of ink taken up and transferred by the vibrator roller 15 (16).

As shown in FIG. 11, the ink-transfer structure 15a (16a) is advantageously subdivided, in the axial direction x of the vibrator roller 15 (16), into an integer number m of individual ink-transfer sections 15c (16c) that are repeated with the determined axial period Δx in the axial direction x, i.e. five (m=5) times in the illustrated example, the ink-transfer structure 15a (16a) thus reflecting the particular distribution of columns of imprints P as for instance illustrated in FIG. 5. This is particularly advantageous in the context of the production of security documents as discussed above. Indeed, this axial subdivision of the ink-transfer structure 15a (16a) into individual ink-transfer sections 15c (16c) that match the particular distribution of columns of imprints P ensures that the vibrator roller 15 (16) takes up and transfers a precise amount of ink that is the same for each column of imprints P. If a single imprint P or single column of imprints P is printed (i.e. m=1), the ink-transfer structure 15a (16a) will evidently consist of a single ink-transfer section 15c (16c).

In the preferred example where the ink-transfer structure 15a (16a) is designed as a relief structure exhibiting raised ink-transfer areas, it is particularly advantageous to structure the ink-transfer structure 15a (16a) in such a way that it guarantees a continuous and uninterrupted circumferential support upon contacting the ink supply roller 14 (15) or the inking roller 31. This can for instance be guaranteed by ensuring that the ink-transfer structure 15a (16a) exhibits at least one continuous support portion 15d (16d) extending in the circumferential direction y over the circumference of the vibrator roller 15 (16), thereby guaranteeing that any given portion of the ink-transfer structure 15a (16a) is always brought into contact with the circumference of the associated ink supply roller 13 (14). This ensures proper frictional engagement of the vibrator roller 15 (16) with the ink supply roller 13 (14) (and the inking roller 31) irrespective of the position where the two rollers get into contact with each other. In the illustrated example, five such continuous support portions 15d (16d) are formed, which continuous support portions 15d (16d) coincide with the highest position of the relevant inking profile IP.

Alternatively, the various ink-transfer sections 15c (16c) could be offset one with respect to the other in the circumferential direction y so as to ensure a continuous and uninterrupted circumferential support. Proper frictional engagement of the vibrator roller 15 (16) with the ink supply roller 13 (14) could also be guaranteed by providing a suitable continuous support portion (e.g. annular sections acting as bearer rings) at both ends of the vibrator roller 15 (16), outside of the region of the ink-transfer structure 15a (16a), in which case the ink-transfer structure 15a (16a) could exhibit a discontinuous contact surface in the circumferential direction y.

Figure 13:
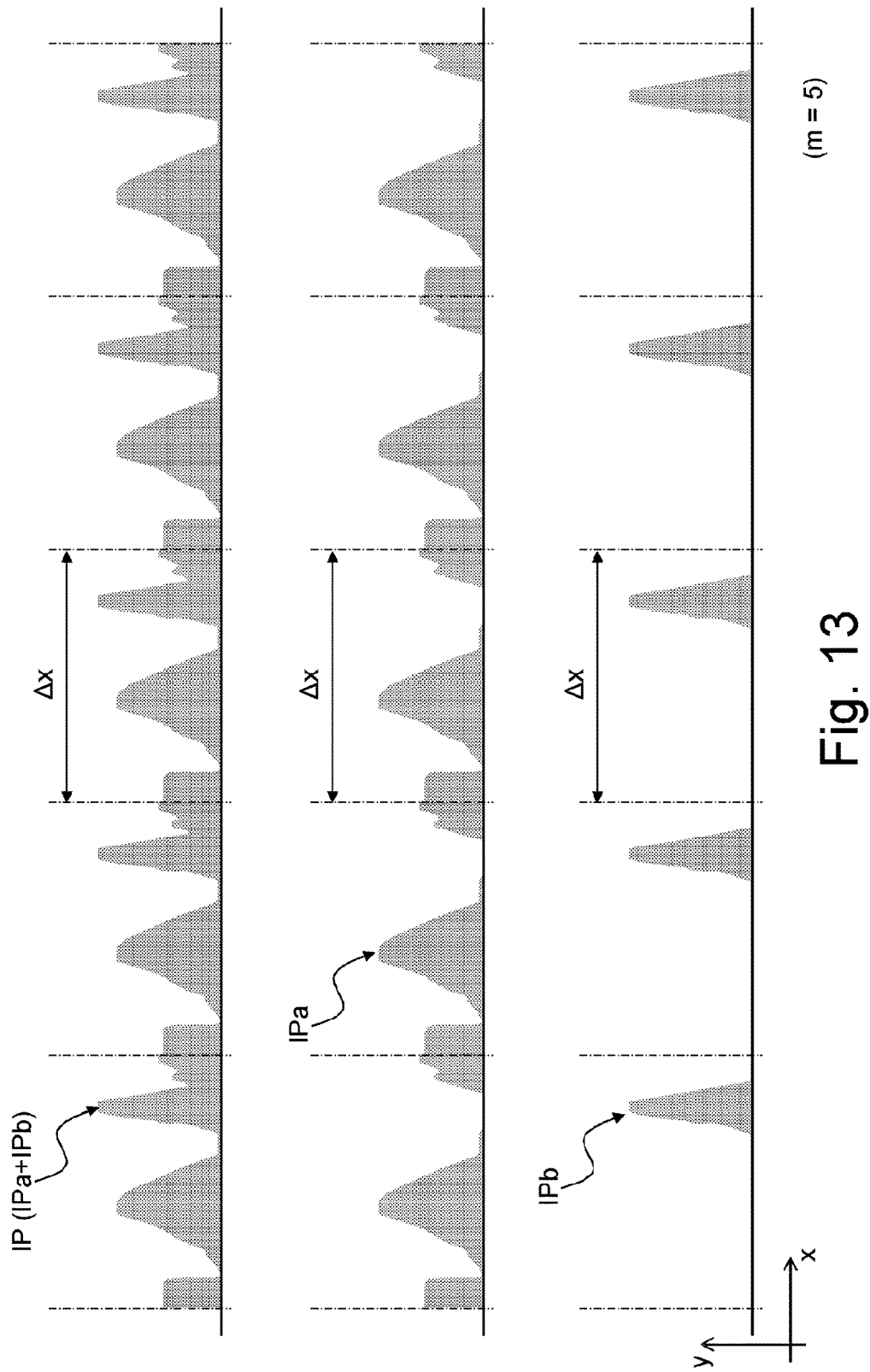
FIG. 13 is an illustrative view of the desired inking profile of FIG. 9 which is repeated along the entire width of the printing plate to be inked, which inking profile is subdivided in this example into first and second parts.
Figure 14:
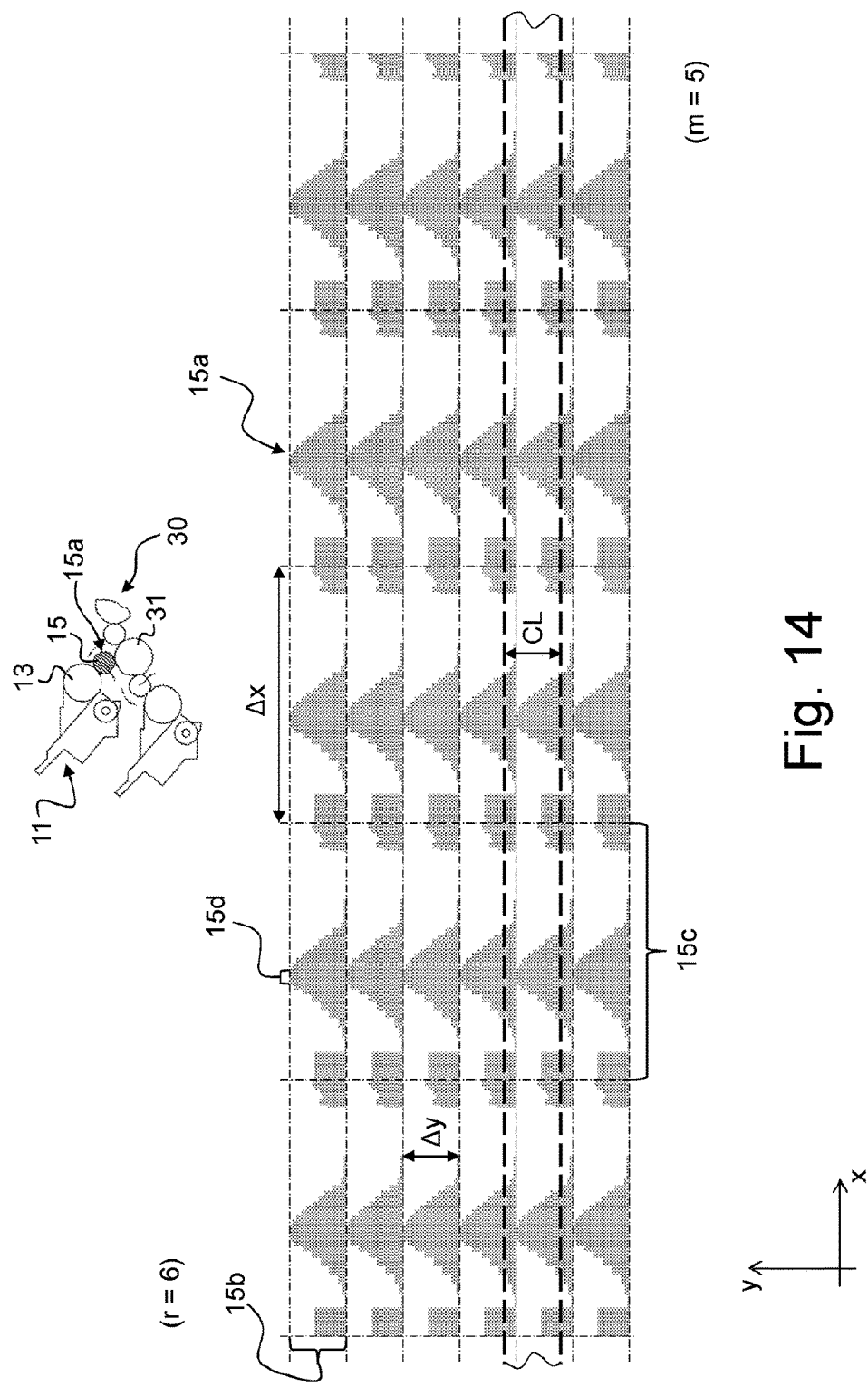
FIG. 14 is an illustrative view of a corresponding, first, ink transfer structure to be provided on a circumference of a first one of the vibrator rollers of the inking apparatus of the printing press in accordance with a second embodiment of the present invention, which first ink transfer structure is representative of the first part of the inking profile of FIG. 13.
Figure 15:
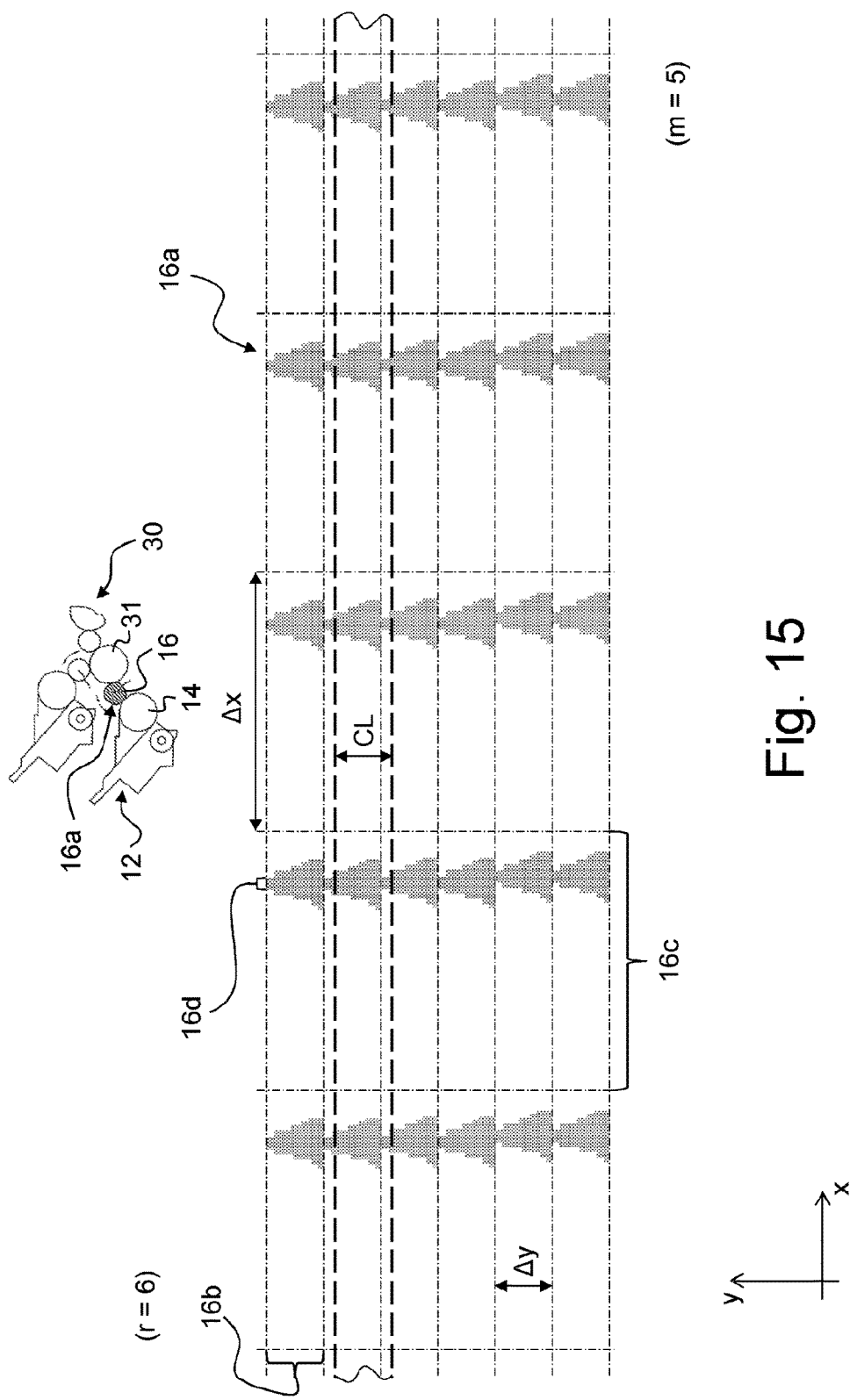
FIG. 15 is an illustrative view of a corresponding, second, ink transfer structure to be provided on a circumference of a second one of the vibrator rollers of the inking apparatus of the printing press in accordance with the second embodiment of the present invention, which second ink transfer structure is representative of the second part of the inking profile of FIG. 13.

FIGS. 13 to 15 are illustrative of a further embodiment of the invention in which both ink ducts 11, 12 are used to ink a given printing plate PP with a desired inking profile IP. As shown in FIG. 13, the desired inking profile IP consists in such case of two parts IPa and IPb, each representing the relevant quantity and distribution of ink to be supplied by the first and second ink ducts 11 and 12 respectively. In essence, the inking principle is similar to that already described with reference to FIGS. 10 to 12, with the main difference that each vibrator roller 15, 16 exhibits on its circumference a corresponding ink-transfer structure 15a, 16a reflecting the first part IPa, respectively second part IPb of the desired inking profile IP as for instance illustrated in FIGS. 14 and 15.

The subdivision of the desired inking profile IP into the first and second parts IPa, IPb and the resulting ink-transfer structures 15a, 16a obviously depend on the particular design to be printed with the printing plate PP and the relevant axial distribution of the two (or more) inks to be supplied to the printing plate PP via the first and second ink ducts 11, 12.

In this latter example, so-called iris or rainbow effects can be produced by partial mixing of the inks in the axial direction x, which partial mixing can be achieved by providing the relevant ink roller train 30 (or 30*) with suitable distribution rollers 35 oscillating in an axial direction x as schematically illustrated in FIG. 3.

Thanks to the invention, adjustment of the inking is improved in a substantial manner. Indeed, thanks to the invention, an adequate modulation and distribution of the quantity of ink is ensured by the relevant ink-transfer structure 15a, 16a provided on the circumference of the vibrator roller 15, 16. The overall amount of ink supplied by the inking apparatus can be adjusted easily by playing with several simple parameters such as (i) the frequency or rate at which the vibrator roller 15 (16) is brought into contact with the associated ink supply roller 13 (14), (ii) the number r of individual ink transfer portions 15b (16b), which impacts the corresponding circumferential period Δy and contact length CL, (iii) the actual contact length CL which can be equivalent to the circumferential period Δy or be an integer multiple thereof, and/or (iv) overall adjustment of the ink film thickness on the circumference of the ink supply roller 13 (14).

In an extreme case, the inking apparatus could be greatly simplified by discarding the typical ink zone system of the known solutions. Indeed, thanks to the invention, adjustment of the inking in individual ink zones may not be necessary anymore as the necessary distribution of ink is ensured by the relevant ink-transfer structure 15a, 16a provided on the circumference of the vibrator roller 15, 16. In other words, each ink duct 11, 12 could be designed as very simple ink fountain devices comprising an ink fountain blade 11a, 12a cooperating with the ink supply roller 13, 14, however with a very simple adjustment system, namely such an adjustment system where the spacing between the ink fountain blade 11a, 12a and the circumference of the ink supply roller 13, 14 is adjustable uniformly over an entire axial length of the ink supply roller 13, 14, rather than by way of individual ink keys as in the known solutions. This being said, individual ink keys could still be of interest if one desires to provide the operator with further ability to individually control the amount of ink in the axial direction x.

Different solutions may be adopted to form the ink-transfer structure of the present invention onto the circumference of the vibrator roller. One solution schematically illustrated by FIG. 17a may consist in structuring an outer layer 15e (16e), made e.g. of rubber, polymer or any other suitable material, that is directly formed onto a circumference of a cylindrical (e.g. metallic) core 15*f* (16*f*) of the vibrator roller 15 (16). Structuring could for instance be carried out by mechanical or laser engraving of the outer layer 15*e* (16*e*). In such case, the outer layer 15*e* (16*e*) could be removed after use and the cylindrical core 15*f* (16*f*) recoated with a new outer layer 15*e* (16*e*) and structured again for further use.

Figures 17A, 17B:
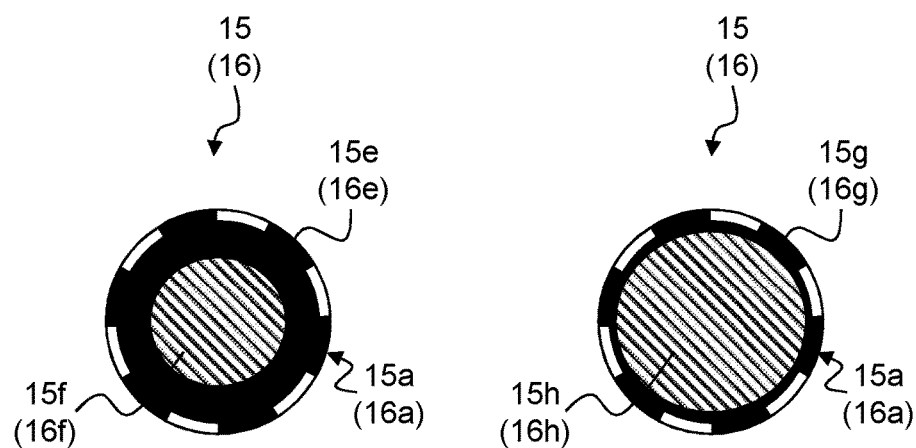
FIGS. 17a and 17b are schematic cross-sectional views of distinct vibrator roller configurations that could be used in the context of the present invention.

An alternate solution schematically illustrated by FIG. 17*b* may consist in structuring a surface of an exchangeable plate or sleeve medium 15*g* (16*g*) to be carried by a cylindrical body 15*h* (16*h*) of the vibrator roller 15 (16). The exchangeable plate or sleeve medium 15*g* (16*g*) could in particular be produced in a manner similar to conventional relief or letterpress printing mediums. In this case, the exchangeable plate or sleeve medium 15*g* (16*g*) could be stored together with the associated printing plate PP for future use.

The ink-transfer structure 15*a* (16*a*) could also be formed by means of 3D-printing techniques, in which case a suitable relief structure could for instance be formed directly onto a circumference of a cylindrical core or on a surface of an exchangeable plate or sleeve medium. As a matter of fact, a complete sleeve medium integrating the ink-transfer structure 15*a* (16*a*) could be formed, as a whole, by 3D-printing.

The material used to produce the ink-transfer structure of the present invention should exhibit suitable properties to ensure proper ink-transfer. In that respect, it is preferable to use such a material that in particular exhibits suitable hardness properties. In the examples discussed above, the ink supply rollers 13, 14 are typically ceramic-coated rollers and the ink-transfer structures 15*a*, 16*a* on the circumference of the vibrator rollers 15, 16 should preferably exhibit a hardness of the order of 37°-40° Shore (A). The material of the ink-transfer structures 15*a*, 16*a* may be rubber, polymer or any other material exhibiting similar properties.

Producing a vibrator roller suitable for use as the (at least one) vibrator roller 15, 16 of the inking apparatus of the invention basically involves the following steps:

(a) providing a desired inking profile of the printing plate to be inked; and (b) forming, on a circumference of the vibrator roller, an ink-transfer structure which reflects the desired inking profile and is designed to modulate a quantity of ink transferred by the vibrator roller in accordance with the principle described above, namely by subdividing the ink-transfer structure on the circumference of the vibrator roller (in a circumferential direction of the vibrator roller) into an integer number r of individual ink-transfer portions that are repeated with a determined circumferential period in the circumferential direction, each individual ink-transfer portion reflecting the desired inking profile of the printing plate to be inked.

Various modifications and/or improvements may be made to the above-described embodiments without departing from the scope of the invention as defined by the annexed claims.

Figure 16:
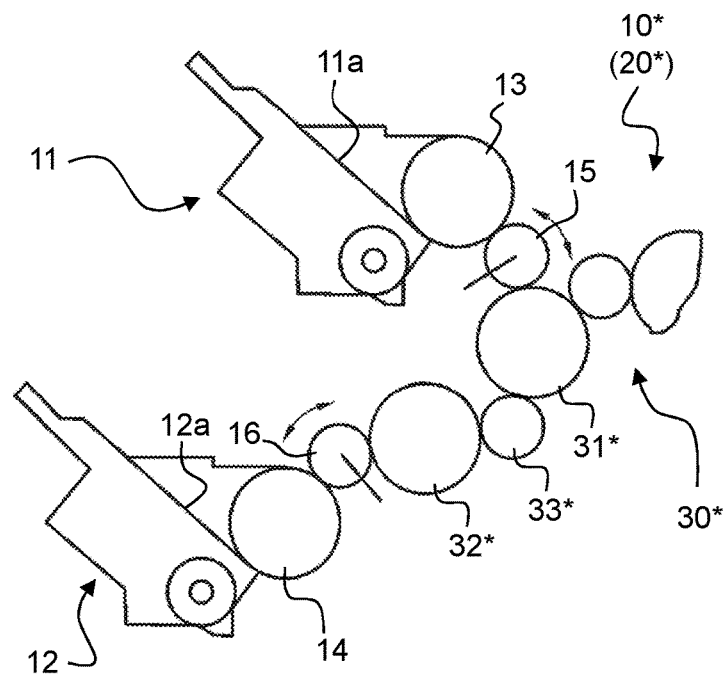
FIG. 16 is a detailed side view of the upstream end of another inking apparatus that could be used in the context of the present invention in lieu of the inking apparatus shown in FIGS. 1 to 4.

In particular, a twin-duct inking apparatus may be of the type illustrated in FIGS. 1 to 4 where both vibrator rollers 15, 16 cooperate with a same inking roller 31 of the ink roller train 30 or of the type illustrated in FIG. 16 where the vibrator rollers 15, 16 cooperate with distinct inking rollers 31*\, 32*\ of the ink roller train 30*\**.

In addition, while the illustrations of FIGS. 11, 12, 14 and 15 show ink-transfer structures 15*a*, 16*a* that are more or less directly mirroring the desired inking profile IP of the printing plate PP to be inked, one could opt for any other suitable ink-transfer structure reflecting the desired inking profile IP. In particular, the ink transfer structure could be a screened structure with zones gradually modulating the quantity of ink in dependence of the desired inking profile. In essence, any structure that can suitably modulate the quantity of ink between 0% and 100% of the desired ink quantity is possible.

While the invention has been described in the context of the production of security documents, it should be appreciated that the invention is not limited to this particular application.

LIST OF REFERENCE NUMERALS USED THEREIN

10 inking apparatus of printing press 100 (four inking apparatuses on the recto side)
10*\ alternate embodiment of inking apparatus (FIG. 12**)
20 inking apparatus of printing press 100 (four inking apparatuses on the verso side)
20*\ alternate embodiment of inking apparatus (FIG. 12**)
11 (first) ink duct/ink fountain device
11*a* ink fountain blade of ink fountain device 11
12 (second) ink duct/ink fountain device
12*a* ink fountain blade of ink fountain device 12
13 (first) ink supply roller (duct roller)
14 (second) ink supply roller (duct roller)
15 (first) vibrator roller cooperating with ink supply roller 13
15*a* ink-transfer structure on circumference of vibrator roller 15 (formed of individual ink-transfer portions 15*b*)
15*b* individual ink-transfer portions which are repeated an integer number (r) of times in the circumferential direction y of the vibrator roller 15
15*c* individual ink-transfer sections which are repeated an integer number (m) of times in the axial direction x of the vibrator roller 15
15*d* continuous support portion of ink-transfer structure 15*a* extending in the circumferential direction y
15*e* structured outer layer of vibrator roller 15 that is directly formed onto a circumference of cylindrical core 15*f* and that is structured to form the ink-transfer structure 15*a* (first variant—FIG. 17*a*)
15*f* cylindrical core of vibrator roller 15 supporting the outer layer 15*e* (first variant—FIG. 17*a*)
15*g* exchangeable plate or sleeve medium of vibrator roller 15 whose surface is structured to form the ink-transfer structure 15*a* (second variant—FIG. 17*b*)
15*h* cylindrical body of vibrator roller 15 carrying the exchangeable plate or sleeve medium 15*g* (second variant—FIG. 17*b*)
16 (second) vibrator roller cooperating with ink supply roller 14
16*a* ink-transfer structure on circumference of vibrator roller 16 (formed of individual ink-transfer portions 16*b*)
16*b* individual ink-transfer portions which are repeated an integer number (r) of times in the circumferential direction y of the vibrator roller 16
16*c* individual ink-transfer sections which are repeated an integer number (m) of times in the axial direction x of the vibrator roller 16
16*d* continuous support portion of ink-transfer structure 16*a* extending in the circumferential direction y
16*e* structured outer layer of vibrator roller 16 that is directly formed onto a circumference of cylindrical core 16*f* and that is structured to form the ink-transfer structure 16*a* (first variant—FIG. 17*a*)
16*f* cylindrical core of vibrator roller 16 supporting the outer layer 16*e* (first variant—FIG. 17*a*)

16g exchangeable plate or sleeve medium of vibrator roller 16 whose surface is structured to form the ink-transfer structure 16a (second variant—FIG. 17b)

16h cylindrical body of vibrator roller 16 carrying the exchangeable plate or sleeve medium 16g (second variant—FIG. 17b)

$\Delta x$ (axial) period at which the individual ink-transfer sections 15c, 16c are repeated in the axial direction x $\Delta y$ (circumferential) period at which the individual ink-transfer portions 15b, 16b are repeated in the circumferential direction y 30 ink roller train (embodiment of FIGS. 1 to 4)

30* ink roller train (alternate embodiment of FIG. 12)

31 inking roller of ink roller train 30 cooperating with vibrator rollers 15, 16

31* (first) inking roller of ink roller train 30* cooperating with vibrator roller 15

32* (second) inking roller of ink roller train 30* cooperating with vibrator roller 16

33* intermediate ink-transfer roller interposed between first and second inking rollers 31*, 32*

35 ink distribution rollers oscillating in the axial direction x 40 (optional) dampening unit 100 simultaneous recto-verso ("Simultan") offset printing press 101 printing group of printing press 100

102 sheet feeder group of printing press 100

103a sheet transfer cylinder (one-segment cylinder)

103b sheet transfer cylinder (two-segment cylinder)

103c sheet transfer cylinder (one-segment cylinder)

104 drying/curing unit 110 (first) blanket cylinder (three-segment cylinder)

115 (four) plate cylinders (one-segment cylinders)

120 (second) blanket cylinder (three-segment cylinder)

125 (four) plate cylinders (one-segment cylinders)

150 pair of side frames supporting blanket cylinders 110, 120

151 (first) mobile inking carriage supporting inking apparatuses 10

152 (second) mobile inking carriage supporting inking apparatuses 20

160 sheet transporting system (with spaced-apart gripper bars)

180 sheet delivery station

S printed sheet

E effective printed area on printed sheet S

P security (e.g. banknote) imprint within effective printed area E (composite offset background)

L length of sheet S (typ. 700 mm)

W width of sheet S (typ. 820 mm)

L1 length of security imprint P (in the axial direction x)

L2 length of security imprint P (in the circumferential direction y)

PP printing plate carried by plate cylinder 115, resp. 125

A (first) pattern on security imprint P

B (second) pattern on security imprint P

IP desired inking profile of printing plate PP

IPa first part of desired inking profile IP as formed e.g. by means of first vibrator roller 15

IPb second part of desired inking profile IP as formed e.g. by means of second vibrator roller 16 x axial direction (transverse to the path of the printed sheets)

y circumferential direction (parallel to the path of the printed sheets)

The invention claimed is:

1. An inking apparatus of a printing press, in particular an offset or letterpress printing press, comprising:

at least one ink duct with an ink supply roller;

an ink roller train comprising at least one inking roller which receives ink from the at least one ink duct; and at least one vibrator roller interposed between the ink supply roller and the inking roller, which vibrator roller is swung back and forth between the ink supply roller and the inking roller and intermittently transfers ink from the ink supply roller to the inking roller, wherein a circumference of the vibrator roller exhibits an ink-transfer structure which reflects a desired inking profile of a printing plate to be inked by the inking apparatus and is designed to modulate a quantity of ink transferred by the vibrator roller, wherein the ink-transfer structure on the circumference of the vibrator roller is subdivided, in a circumferential direction of the vibrator roller, into an integer number of individual ink-transfer portions that are repeated with a determined circumferential period in the circumferential direction, each individual ink-transfer portion reflecting the desired inking profile of the printing plate to be inked by the inking apparatus, and wherein a contact length over which the vibrator roller runs in contact with the ink supply roller is equivalent to the determined circumferential period of the individual ink-transfer portions or to an integer multiple of the determined circumferential period of the individual ink-transfer portions.

2. The inking apparatus as defined in claim 1, wherein the integer number of individual ink-transfer portions that are repeated in the circumferential direction is lower or equal to 10.

3. The inking apparatus as defined in claim 2, wherein the integer number of individual ink-transfer portions that are repeated in the circumferential direction is within a range of 4 to 6.

4. The inking apparatus as defined in claim 1, wherein the ink-transfer structure on the circumference of the vibrator roller is a structured outer layer that is directly formed onto a circumference of a cylindrical core of the vibrator roller or a structured surface of an exchangeable plate or sleeve medium carried by a cylindrical body of the vibrator roller.

5. The inking apparatus as defined in claim 1, wherein the ink-transfer structure on the circumference of the vibrator roller is a relief structure exhibiting raised ink-transfer areas.

6. The inking apparatus as defined in claim 5, wherein at least the ink-transfer structure is a 3D-printed structure.

7. The inking apparatus as defined in claim 1, wherein the ink-transfer structure on the circumference of the vibrator roller is structured in such a way that the ink-transfer structure guarantees a continuous and uninterrupted circumferential support upon contacting the ink supply roller or the inking roller.

8. The inking apparatus as defined in claim 1, wherein the ink-transfer structure is subdivided, in an axial direction of the vibrator roller, into an integer number of individual ink-transfer sections that are repeated with a determined axial period the axial direction.

9. The inking apparatus as defined in claim 1, wherein the at least one ink duct is an ink fountain device comprising an ink fountain blade cooperating with the ink supply roller, which ink fountain blade is positioned with respect to a circumference of the ink supply roller to leave a selected spacing between the ink fountain blade and the circumference of the ink supply roller.

10. The inking apparatus as defined in claim 9, wherein the selected spacing between the ink fountain blade and the circumference of the ink supply roller is adjustable uniformly over an entire axial length of the ink supply roller.

11. The inking apparatus as defined in claim 1, comprising:
   a first ink duct with a first ink supply roller;
   a first vibrator roller interposed between the first ink supply roller and a first inking roller of the ink roller train, which first vibrator roller is swung back and forth between the first ink supply roller and the first inking roller and intermittently transfers ink from the first ink supply roller to the first inking roller;
   a second ink duct with a second ink supply roller; and
   a second vibrator roller interposed between the second ink supply roller and the first inking roller, which second vibrator roller is swung back and forth between the second ink supply roller and the first inking roller and intermittently transfers ink from the second ink supply roller to the first inking roller,
   wherein a circumference of the first vibrator roller exhibits a first ink-transfer structure which reflects a first part of the desired inking profile and is designed to modulate a quantity of ink transferred by the first vibrator roller,
   and wherein a circumference of the second vibrator roller exhibits a second ink-transfer structure which reflects a second part of the desired inking profile and is designed to modulate a quantity of ink transferred by the second vibrator roller.

12. The inking apparatus as defined in claim 1, comprising:
   a first ink duct with a first ink supply roller;
   a first vibrator roller interposed between the first ink supply roller and a first inking roller of the ink roller train, which first vibrator roller is swung back and forth between the first ink supply roller and the first inking roller and intermittently transfers ink from the first ink supply roller to the first inking roller;
   a second ink duct with a second ink supply roller; and
   a second vibrator roller interposed between the second ink supply roller and a second inking roller of the ink roller train, which second vibrator roller is swung back and forth between the second ink supply roller and the second inking roller and intermittently transfers ink from the second ink supply roller to the second inking roller;
   wherein a circumference of the first vibrator roller exhibits a first ink-transfer structure which reflects a first part of the desired inking profile and is designed to modulate a quantity of ink transferred by the first vibrator roller,
   and wherein a circumference of the second vibrator roller exhibits a second ink-transfer structure which reflects a second part of the desired inking profile and is designed to modulate a quantity of ink transferred by the second vibrator roller.

13. The inking apparatus as defined in claim 1, wherein the ink roller train includes at least one distribution roller oscillating in an axial direction.

14. The inking apparatus as defined in claim 1, wherein the ink-transfer structure on the circumference of the at least one vibrator roller is derived from prepress data of the relevant printing plate to be inked.

15. The inking apparatus as defined in claim 14, wherein the prepress data complies with the CIP3 Print Production Format.

16. A printing press comprising an inking apparatus as defined in claim 1.

17. The printing press as defined in claim 16, wherein the printing press is an offset printing press.

18. The printing press as defined in claim 17, wherein the printing press is an offset printing press for simultaneous recto-verso printing of security documents.

19. A method of producing a vibrator roller suitable for use as the at least one vibrator roller of the inking apparatus defined in claim 1, comprising the steps of:
   (a) providing a desired inking profile of the printing plate to be inked; and
   (b) forming, on a circumference of the vibrator roller, an ink-transfer structure which reflects the desired inking profile and is designed to modulate a quantity of ink transferred by the vibrator roller,
   wherein the ink-transfer structure on the circumference of the vibrator roller is subdivided, in a circumferential direction of the vibrator roller, into an integer number of individual ink-transfer portions that are repeated with a determined circumferential period in the circumferential direction, each individual ink-transfer portion reflecting the desired inking profile of the printing plate to be inked.

20. The method as defined in claim 19, wherein step (b) includes structuring an outer layer that is directly formed onto a circumference of a cylindrical core of the vibrator roller or structuring a surface of an exchangeable plate or sleeve medium to be carried by a cylindrical body of the vibrator roller.

21. The method as defined in claim 19, wherein the ink-transfer structure is formed as a relief structure exhibiting raised ink-transfer areas.

22. The method as defined in claim 21, wherein at least the ink-transfer structure is produced by 3D-printing.

23. The method as defined in claim 19, wherein step (a) includes deriving the desired inking profile from prepress data of the relevant printing plate to be inked.

24. The method as defined in claim 23, wherein the prepress data complies with the CIP3 Print Production Format.

* * * * *